(12) United States Patent
Kwon et al.

(10) Patent No.: US 9,668,003 B2
(45) Date of Patent: May 30, 2017

(54) METHOD AND APPARATUS FOR TRANSMITTING AND RECEIVING DATA

(75) Inventors: O-hoon Kwon, Suwon-si (KR); Sun-bal Kim, Suwon-si (KR); Ho-jin Ha, Suwon-si (KR); Guanhua Zhang, Suwon-si (KR); Hyung-tak Choi, Suwon-si (KR); Ji-Eun Keum, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/033,108

(22) Filed: Feb. 23, 2011

(65) Prior Publication Data
US 2011/0208829 A1    Aug. 25, 2011

Related U.S. Application Data

(60) Provisional application No. 61/392,645, filed on Oct. 13, 2010, provisional application No. 61/390,170, (Continued)

(30) Foreign Application Priority Data

Oct. 22, 2010   (KR) .................. 10-2010-0103727

(51) Int. Cl.
*G06F 12/16*       (2006.01)
*H04N 21/2343*   (2011.01)
(Continued)

(52) U.S. Cl.
CPC ... *H04N 21/23439* (2013.01); *H04N 21/2353* (2013.01); *H04N 21/2362* (2013.01); (Continued)

(58) Field of Classification Search
CPC ..... H04N 21/234327; H04N 21/23439; H04N 21/2353; H04N 21/2362; H04N 21/8456; (Continued)

(56) References Cited

U.S. PATENT DOCUMENTS 5,784,528 A    7/1998 Yamane et al.
6,851,091 B1   2/2005 Honda et al.
(Continued)

FOREIGN PATENT DOCUMENTS

CN    1290895 A    4/2001
CN    1459066 A    11/2003
(Continued)

OTHER PUBLICATIONS

International Search Report (PCT/ISA/210) issued on Aug. 23, 2011 in the International Patent Application No. PCT/KR2010/008696.
(Continued)

*Primary Examiner* — Kenneth R Coulter
(74) *Attorney, Agent, or Firm* — Sughrue Mion, PLLC

(57) ABSTRACT

A method and apparatus for transmitting and receiving data are provided. In the method of receiving data, at least one of a plurality of media data generated by encoding content to have different qualities is received, the plurality of media data each including at least one segment; location information indicating a randomly accessible point of each of the at least one segment is obtained; and random accessing is provided on the received media data, based on the location information.

16 Claims, 42 Drawing Sheets

Related U.S. Application Data filed on Oct. 5, 2010, provisional application No. 61/380,461, filed on Sep. 7, 2010, provisional application No. 61/370,970, filed on Aug. 5, 2010, provisional application No. 61/323,536, filed on Apr. 13, 2010, provisional application No. 61/310,104, filed on Mar. 3, 2010, provisional application No. 61/307,093, filed on Feb. 23, 2010, provisional application No. 61/314,233, filed on Mar. 16, 2010.

(51) Int. Cl.

| | | |
|---|---|---|
| H04N 21/235 | (2011.01) | |
| H04N 21/2362 | (2011.01) | |
| H04N 21/24 | (2011.01) | |
| H04N 21/658 | (2011.01) | |
| H04N 21/845 | (2011.01) | |
| H04N 21/81 | (2011.01) | |
| G06F 15/16 | (2006.01) | |

(52) U.S. Cl.
CPC .. *H04N 21/234327* (2013.01); *H04N 21/2402* (2013.01); *H04N 21/6581* (2013.01); *H04N 21/812* (2013.01); *H04N 21/8455* (2013.01); *H04N 21/8456* (2013.01)

(58) Field of Classification Search
CPC ............ H04N 21/6581; H04N 21/812; H04N 21/8455; H04N 21/2402
USPC .................... 709/245, 217–219, 230, 231
See application file for complete search history.

(56) References Cited

U.S. PATENT DOCUMENTS

| | | | |
|---|---|---|---|
| 6,895,410 B2 | 5/2005 | Ridge | |
| 7,103,668 B1 | 9/2006 | Corley et al. | |
| 7,421,127 B2 | 9/2008 | Bruls et al. | |
| 7,447,791 B2 | 11/2008 | Leaning et al. | |
| 7,760,990 B2 | 7/2010 | Kato | |
| 7,944,908 B2 | 5/2011 | Lee et al. | |
| 8,176,029 B2 | 5/2012 | Wang | |
| 8,341,662 B1 | 12/2012 | Bassett et al. | |
| 8,619,851 B2 | 12/2013 | Ito | |
| 8,661,105 B2 | 2/2014 | Tian et al. | |
| 2002/0053085 A1 | 5/2002 | Toguri | |
| 2002/0161739 A1 | 10/2002 | Oh | |
| 2003/0061369 A1 | 3/2003 | Aksu et al. | |
| 2003/0072376 A1 | 4/2003 | Krishnamachari et al. | |
| 2003/0177503 A1 | 9/2003 | Sull et al. | |
| 2003/0189649 A1 | 10/2003 | Kuno | |
| 2003/0236895 A1 | 12/2003 | Ohkubo et al. | |
| 2004/0064572 A1 | 4/2004 | Yamaguchi et al. | |
| 2004/0064573 A1 | 4/2004 | Leaning et al. | |
| 2004/0119814 A1 | 6/2004 | Clisham et al. | |
| 2004/0220966 A1 | 11/2004 | Ridge | |
| 2005/0018873 A1 | 1/2005 | Rhoads | |
| 2005/0047345 A1 | 3/2005 | Suh | |
| 2005/0071491 A1 | 3/2005 | Seo | |
| 2005/0102371 A1 | 5/2005 | Aksu | |
| 2005/0135476 A1 | 6/2005 | Gentric et al. | |
| 2005/0160177 A1 | 7/2005 | Kim | |
| 2005/0183120 A1 | 8/2005 | Jain et al. | |
| 2005/0193138 A1 | 9/2005 | Kim | |
| 2005/0193425 A1 | 9/2005 | Sull et al. | |
| 2005/0198282 A1 | 9/2005 | Stahl et al. | |
| 2005/0234892 A1 | 10/2005 | Tamura | |
| 2005/0262541 A1 | 11/2005 | Oota | |
| 2006/0037057 A1 | 2/2006 | Xu | |
| 2006/0120378 A1 | 6/2006 | Usuki et al. | |
| 2006/0126713 A1 | 6/2006 | Chou et al. | |
| 2007/0003251 A1 | 1/2007 | Chung et al. | |
| 2007/0016657 A1 | 1/2007 | Ito | |
| 2007/0025687 A1 | 2/2007 | Kim | |
| 2007/0101164 A1 | 5/2007 | Ando et al. | |
| 2007/0177854 A1 | 8/2007 | Ando et al. | |
| 2008/0040498 A1 | 2/2008 | Setlur et al. | |
| 2008/0069204 A1 | 3/2008 | Uchiike | |
| 2008/0109532 A1 | 5/2008 | Denoual et al. | |
| 2008/0177865 A1 | 7/2008 | Heo et al. | |
| 2008/0195743 A1 | 8/2008 | Brueck et al. | |
| 2008/0301380 A1 | 12/2008 | Itho | |
| 2009/0010273 A1 | 1/2009 | Green et al. | |
| 2009/0018681 A1 | 1/2009 | Lee et al. | |
| 2009/0031007 A1 | 1/2009 | Boic et al. | |
| 2009/0055417 A1 | 2/2009 | Hannuksela | |
| 2009/0089535 A1 | 4/2009 | Lohmar et al. | |
| 2009/0097819 A1 | 4/2009 | Dui et al. | |
| 2009/0106288 A1 | 4/2009 | Yang et al. | |
| 2009/0110060 A1 | 4/2009 | Cortes et al. | |
| 2009/0141888 A1 | 6/2009 | Kim et al. | |
| 2009/0204487 A1 | 8/2009 | Cansler et al. | |
| 2009/0258594 A1 | 10/2009 | Martin-Cocher et al. | |
| 2009/0300145 A1 | 12/2009 | Musayev et al. | |
| 2010/0046611 A1 | 2/2010 | Toma et al. | |
| 2010/0138489 A1 | 6/2010 | Corley et al. | |
| 2010/0262711 A1* | 10/2010 | Bouazizi ...................... 709/231 | |
| 2011/0029649 A1 | 2/2011 | Tian et al. | |
| 2011/0119394 A1 | 5/2011 | Wang et al. | |
| 2011/0231519 A1* | 9/2011 | Luby et al. .................. 709/219 |
| 2011/0231569 A1* | 9/2011 | Luby et al. .................. 709/234 |
| 2011/0238789 A1* | 9/2011 | Luby et al. .................. 709/219 |
| 2011/0239078 A1* | 9/2011 | Luby et al. .................. 714/752 |
| 2011/0246659 A1* | 10/2011 | Bouazizi ...................... 709/231 |
| 2012/0023250 A1* | 1/2012 | Chen et al. .................. 709/231 |
| 2012/0042050 A1* | 2/2012 | Chen et al. .................. 709/219 |
| 2012/0042089 A1* | 2/2012 | Chen et al. .................. 709/231 |
| 2012/0042090 A1* | 2/2012 | Chen et al. .................. 709/231 |
| 2012/0185570 A1* | 7/2012 | Bouazizi et al. ............. 709/219 |
| 2012/0221741 A1* | 8/2012 | Frojdh et al. ................. 709/231 |
| 2015/0256585 A1 | 9/2015 | Brueck et al. | |
| 2016/0323342 A1 | 11/2016 | Luby et al. | |

FOREIGN PATENT DOCUMENTS

| | | |
|---|---|---|
| CN | 1481643 A | 3/2004 |
| CN | 1559119 A | 12/2004 |
| CN | 1568620 A | 1/2005 |
| CN | 1575603 A | 2/2005 |
| CN | 1592418 A | 3/2005 |
| CN | 1625880 A | 6/2005 |
| CN | 1698378 A | 11/2005 |
| CN | 1764974 A | 4/2006 |
| CN | 1784652 A | 6/2006 |
| CN | 1787422 A | 6/2006 |
| CN | 1902865 A | 1/2007 |
| CN | 1985321 A | 6/2007 |
| CN | 1988547 A | 6/2007 |
| CN | 101014947 A | 8/2007 |
| CN | 101018323 A | 8/2007 |
| CN | 101247511 A | 8/2008 |
| CN | 101321265 A | 12/2008 |
| CN | 101365128 A | 2/2009 |
| CN | 101371307 A | 2/2009 |
| CN | 101459809 A | 6/2009 |
| CN | 101518027 A | 8/2009 |
| CN | 101521583 A | 9/2009 |
| EP | 1 043 892 A1 | 10/2000 |
| EP | 1 395 014 B1 | 6/2006 |
| EP | 2117143 A2 | 11/2009 |
| JP | 06-252876 A | 9/1994 |
| JP | 2000-13761 A | 1/2000 |
| JP | 2000-341640 A | 12/2000 |
| JP | 2001-024994 A | 1/2001 |
| JP | 2001-359081 A | 12/2001 |
| JP | 2003-087737 A | 3/2003 |
| JP | 2003-235031 A | 8/2003 |
| JP | 2004-013283 A | 1/2004 |
| JP | 2004-88766 A | 3/2004 |
| JP | 2004-135307 A | 4/2004 |
| JP | 2004-140584 A | 5/2004 |
| JP | 2004-140654 A | 5/2004 |
| JP | 2004-516717 A | 6/2004 |

(56) References Cited

FOREIGN PATENT DOCUMENTS

| | | |
|---|---|---|
| JP | 2004-186890 A | 7/2004 |
| JP | 2004-215074 A | 7/2004 |
| JP | 2004-312304 A | 11/2004 |
| JP | 2004-328204 A | 11/2004 |
| JP | 2005-039667 A | 2/2005 |
| JP | 2005-073138 A | 3/2005 |
| JP | 2005-229153 A | 8/2005 |
| JP | 2005-303927 A | 10/2005 |
| JP | 2006-304232 A | 11/2006 |
| JP | 2006-311328 A | 11/2006 |
| JP | 2007-11584 A | 1/2007 |
| JP | 2007-25959 A | 2/2007 |
| JP | 2007-036666 A | 2/2007 |
| JP | 2007-274142 A | 10/2007 |
| JP | 2008-97381 A | 4/2008 |
| JP | 2008-219267 A | 9/2008 |
| JP | 2008-236667 A | 10/2008 |
| JP | 2009-17345 A | 1/2009 |
| JP | 2009-134700 A | 6/2009 |
| JP | 2009-159625 A | 7/2009 |
| JP | 2013505680 A | 2/2013 |
| JP | 2003-111048 A | 4/2015 |
| KR | 10-0805308 B1 | 2/2008 |
| KR | 10-2008-0099629 A | 11/2008 |
| KR | 10-2009-0028017 A | 3/2009 |
| KR | 10-2009-0036765 A | 4/2009 |
| KR | 10-2009-0063775 A | 6/2009 |
| KR | 10-0920733 B1 | 10/2009 |
| KR | 10-2010-0007368 A | 1/2010 |
| WO | 02/49343 A1 | 6/2002 |
| WO | 2005/043783 A1 | 5/2005 |
| WO | 2006/105158 A2 | 10/2006 |
| WO | 2007/095834 A1 | 8/2007 |
| WO | 2008/062979 A1 | 5/2008 |
| WO | 2008/130191 A1 | 10/2008 |
| WO | 2009/119394 A1 | 10/2009 |
| WO | 2009/158344 A2 | 12/2009 |

OTHER PUBLICATIONS

International Search Report (PCT/ISA/210) issued on Jul. 13, 2011 in the International Patent Application No. PCT/KR2010/008017.
International Search Report (PCT/ISA/210) issued on Jul. 15, 2011 in the International Patent Application No. PCT/KR2010/008068.
International Search Report (PCT/ISA/210) issued on Jul. 23, 2011 in the International Patent Application No. PCT/KR2010/008015.
International Search Report (PCT/ISA/210) issued on Jul. 8, 2011 in the International Patent Application No. PCT/KR2010/008016.
International Search Report (PCT/ISA/210), dated Aug. 16, 2011, issued by the International Searching Authority in International Patent Application No. PCT/KR2010/008060.
Written Opinion (PCT/ISA/237), dated Aug. 16, 2011, issued by the International Searching Authority in International Patent Application No. PCT/KR2010/008060.
International Search Report (PCT/ISA/210), dated Nov. 3, 2011, issued by the International Searching Authority in International Patent Application No. PCT/KR2011/001898.
Written Opinion (PCT/ISA/237), dated Nov. 3, 2011, issued by the International Searching Authority in International Patent Application No. PCT/KR2011/001898.
International Search Report issued by the International Searching Authority in counterpart International Application No. PCT/KR2011/001268 on Nov. 25, 2011.
Communication from the State Intellectual Property Office of P.R. China dated Dec. 4, 2015 in a counterpart Chinese application No. 201080061494.4.
S. Bradner, "Key words for use in RFCs to Indicate Requirement Levels", Network Working Group, Request for Comments: 2119, BCP: 14, Category: Best Current Practice, Harvard University, Mar. 1997, https://www.ietf.org/rfc/rfc2119.txt, pp. 1-3.
ETSI, "Digital Video Broadcasting (DVB); Specification for the use of Video and Audio Coding in Broadcasting Applications based on the MPEG-2 Transport Stream", ETSI TS 101 154 V1.9.1 (Sep. 2009), Technical Specification, pp. 1-163.
ETSI, "Digital Video Broadcasting (DVB); Transport of MPEG-2 TS Based DVB Services over IP Based Networks", ETSI TS 102 034 V1.3.1 (Oct. 2007), Technical Specification, pp. 1-128.
ITU-T, "Series H: Audiovisual and Multimedia Systems Infrastructure of audiovisual services—Transmission multiplexing and synchronization", Amendment 3: Transport of AVC video data over ITU-T Rec. H.222.0 | ISO/IEC 13818-1 streams, (Mar. 2004), ISO/IEC 13818-1:2000/Amd.3:2004 (E), International Telecommunication Union, total 26 pages.
International Standard, "Information technology—Coding of audiovisual objects—Part 12: ISO base media file format", ISO/IEC 14496-12:2005(E), Second edition Apr. 1, 2005, Corrected version Oct. 1, 2005, total 93 pages.
International Standard, "Information technology—Coding of audiovisual objects—Part 14: MP4 file format", ISO/IEC 14496-14:2003(E), First edition Nov. 15, 2003, total 18 pages.
International Standard, "Information technology—Coding of audiovisual objects—Part 15: Advanced Video Coding (AVC) file format", ISO/IEC 14496-15:2004(E), First edition Apr. 15, 2004, total 29 pages.
ITU-T, "Series H: Audiovisual and Multimedia Systems Infrastructure of audiovisual services—Coding of moving video", ITU-T Recommendation H.264, (Mar. 2005), International Telecommunication Union, total 382 pages.
International Standard, "Information technology—Generic coding of moving pictures and associated audio information—Part 2: Video", ISO/IEC 13818-2:2013(E), Third edition Oct. 1, 2013, total 13 pages.
ETSI, "Digital Video Broadcasting (DVB); Subtitling systems", ETSI EN 300 743 V1.3.1 (Nov. 2006), European Standard (Telecommunications series), pp. 1-51.
ETSI, "Digital Video Broadcasting (DVB); Specification for conveying ITU-R System B Teletext in DVB bitstreams", ETSI EN 300 472 V1.3.1 (May 2003), European Standard (Telecommunications series), pp. 1-11.
International Standard, "Information technology—Coding of audiovisual objects—Part 3: Audio", ISO/IEC 14496-3:2009(E), Fourth edition Sep. 1, 2009, total 18 pages.
ETSI, "Digital Audio Compression (AC-3, Enhanced AC-3) Standard", ETSI TS 102 366 V1.2.1 (Aug. 2008), Technical Specification, pp. 1-214.
International Telecommunication Union, "Terminal Equipment and Protocols For Telematic Services", Information Technology—Digital Compression and Coding of Continuous-Tone Still Images—Requirements and Guidelines, CCITT, Recommendation T.81, (Sep. 1992), ISO/IEC 10918-1 : 1993(E), total 186 pages.
International Standard, "Information technology—Coding of audiovisual objects—Part 2: Visual", ISO/IEC 14496-2:2004(E), Third edition Jun. 1, 2004, total 18 pages.
ETSI, "Universal Mobile Telecommunications System (UMTS); LTE; Transparent end-to-end Packet-switched Streaming Service (PSS); Protocols and codecs (3GPP TS 26.234 version 9.7.0 Release 9)", ETSI TS 126 234 V9.7.0 (Jan. 2012), Technical Specification, total 191 pages.
ETSI, "Digital cellular telecommunications system (Phase 2+); Universal Mobile Telecommunications System (UMTS); LTE; Transparent end-to-end packet switchedstreaming service (PSS); 3GPP file format (3GP) (3GPP TS 26.244 version 9.0.0 Release 9)", ETSI TS 126 244 V9.0.0 (Jan. 2010), Technical Specification, total 54 pages.
Chen, et al., "Response to the CfP on HTTP Streaming: Adaptive Video Streaming based on AVC", International Organization for Standardisation, MPEG Meeting, Jul. 26-Jul. 30, 2010, Issue No. M17909, pp. 1-20, Geneva, Switzerland, XP030046499.
Communication issued Apr. 1, 2016, issued by the State Intellectual Property Office of the People's Republic of China in counterpart Chinese Patent Application No. 201180027573.8.
Communication issued Apr. 25, 2016, issued by the European Patent Office in counterpart European Patent Application No. 10830204.3.

(56) References Cited

OTHER PUBLICATIONS

Communication issued May 9, 2016, issued by the European Patent Office in counterpart European Patent Application No. 11790033.2.
Communication dated May 22, 2014 issued by the European Patent Office in counterpart European Application No. 11790033.2.
Communication dated Jul. 2, 2014 issued by the State Intellectual Property Office of P.R. China in counterpart Chinese Application No. 201080061417.9.
Communication dated Jul. 3, 2014 issued by the State Intellectual Property Office of P.R. China in counterpart Chinese Application No. 201180010793.X.
Communication dated Jul. 1, 2014 issued by the Japanese Patent Office in counterpart Japanese Application No. 2012-538764.
Communication dated Jul. 15, 2014 issued by the Japanese Patent Office in counterpart Japanese Application No. 2012-538765.
Communication dated Apr. 27, 2015 issued by the Japanese Patent Office in counterpart Japanese Patent Application No. 2012-538768.
Communication dated May 18, 2015, issued by the State Intellectual Property Office of the People's Republic of China in counterpart Chinese Application No. 201080061494.4.
Communication from the Japanese Patent Office dated Mar. 23, 2015 in a counterpart Japanese application No. 2012-553824.
Communication from the State Intellectual Property Office of P.R. China dated Mar. 17, 2015 in a counterpart application No. 201080061417.9.
Communication from the Japanese Patent Office dated Apr. 13, 2015 in a counterpart Japanese application No. 2012-538771.
Communication from the Japanese Patent Office dated Feb. 2, 2015 in a counterpart Japanese application No. 2012-538765.
Communication from the Japanese Patent Office dated Apr. 6, 2015 in a counterpart Japanese application No. 2012-538764.
Communication dated Aug. 27, 2014, issued by the State Intellectual Property Office of the People's Republic of China in counterpart Chinese Application No. 201080061494.4.
Communication dated Aug. 4, 2014, issued by the State Intellectual Property Office of the People's Republic of China in counterpart Chinese Application No. 201080061416.4.
Communication dated Aug. 5, 2014, issued by the Japanese Patent Office in counterpart Japanese Application No. 2012-538771.
Communication dated Aug. 20, 2014, issued by the State Intellectual Property Office of the People's Republic of China in counterpart Chinese Application No. 201080061434.2.
Communication dated Aug. 5, 2014, issued by the Japanese Patent Office in counterpart Japanese Application No. 2012-538768.
Communication dated Aug. 19, 2014, issued by the Japanese Patent Office in counterpart Japanese Application No. 2012-543023.
Communication dated Sep. 24, 2014, issued by the Japanese Patent Office in counterpart Japanese Application No. 2012-553824.
Communication dated Mar. 24, 2015 issued by European Patent Office in counterpart European Application No. 11756585.3.
Communication dated Jul. 9, 2015, issued by the State Intellectual Property Office of P.R. China in counterpart Chinese Application No. 201180014696.8.
Communication dated Aug. 13, 2015, issued by the State Intellectual Property Office of P.R. China in counterpart Chinese Application No. 201080061417.9.
Communication dated Aug. 5, 2015, issued by the State Intellectual Property Office of P.R. China in counterpart Chinese Application No. 201180027573.8.
Communication dated Feb. 7, 2014 issued by the European Patent Office in counterpart European Application No. 10830205.0.
Pantos R., et al., "HTTP Live Streaming; draft-pantos-http-live-straming-0.2.txt", Oct. 5, 2009, 20 pgs. total, XP015064407.
Alex Zambelli, "IIS Smooth Streaming Technical Overview", Mar. 31, 2009, 17 pgs. total, XP055009366.
Jin Young Lee et al., "DASH Evaluation Experiment #1: Compositions of Media Presentation (CMP) Proposal Comparison", Oct. 15, 2010, 56 pgs. total, XP030046599.
Wager Zia, "A few comments on LGE proposal about delivery of MPEG-2-TS", Oct. 15, 2010, 3 pgs. total, XP030047157.

Communication dated Feb. 12, 2014 issued by the European Patent Office in counterpart European Application No. 10830206.8.
Communication dated Feb. 12, 2014 issued by the European Patent Office in counterpart European Application No. 10830223.3.
Communication dated Feb. 25, 2014 issued by the European Patent Office in counterpart European Application No. 10830218.3.
Communication dated Mar. 4, 2014 issued by the European Patent Office in counterpart European Application No. 10830204.3.
Jaeyeon Song, et al., "Response to Call for Proposals for HTTP Streaming of MPEG Media standard", Jul. 30, 2010, 60 pgs. total, XP030046369.
Gerard Fernando, et al., "HTTP Streaming Solution-Response to Call for Proposal", Jul. 30, 2010, 32 pgs. total, XP030046346.
European Search Report dated Apr. 25, 2014 issued by the European Patent Office in counterpart European Application No. 10836186.6.
John A. Bocharov, "Smooth Streaming Technical Overview", CM-IPTV0560, Oct. 20, 2009, 18 pgs. total, XP017826991.
Communication dated Apr. 25, 2014 issued by the European Patent Office in counterpart European Application No. 11747701.8.
Communication dated Apr. 25, 2014 issued by the European Patent Office in counterpart European Application No. 11756585.3.
Communication dated Feb. 18, 2014 issued by the State Intellectual Property Office of P.R. China in counterpart Chinese Application No. 201080055449.8.
Communication dated Apr. 15, 2014 issued by the State Intellectual Property Office of P.R. China in counterpart Chinese Application No. 201080061413.0.
"Transparent End-to-End Packet-Switched Streaming Service (PSS); Protocols and Codecs (Release 9)", 3GPP TS 26.234, Mar. 2012, 188 pages total.
"Release 2 Specification HTTP Adaptive Streaming", Open IPTV Forum, Sep. 2010, 25 pages total.
Communication dated Nov. 3, 2014, issued by the State Intellectual Property Office of the People's Republic of China in counterpart Chinese Application No. 201180014696.8.
Communication dated Dec. 19, 2014, issued by the Japanese Patent Office in counterpart Japanese Application No. 2012-543023.
International Search Report (PCT/ISA/210) issued on Mar. 28, 2012 in the International Patent Application No. PCT/KR2011/004064.
Alex Zambelli, "IIS Smooth Streaming Technical Overview", Microsoft Corporation, Mar. 2009, pp. 1-17.
Communication dated Jul. 15, 2016, issued by the Korean Intellectual Property Office in counterpart Korean application No. 10-2010-0103727.
Communication dated Aug. 15, 2016, issued by the Japanese Patent Office in counterpart Japanese application No. 2015-156368.
Communication dated Sep. 12, 2016, issued by the Japanese Patent Office in counterpart Japanese application No. 2012-538764.
Communication dated Aug. 1, 2016, issued by the State Intellectual Property Office of P.R. China in counterpart Chinese application No. 201080061494.4.
Communication dated Aug. 29, 2016, issued by the Japanese Patent Office in counterpart Japanese application No. 2015-159842.
Communication dated Aug. 29, 2016, issued by the Japanese Patent Office in counterpart Japanese application No. 2012-538771.
Qualcomm Incorporated, et al., "3GPP Adaptive HTTP Streaming", Proposal to MPEG HTTP Streaming, 93rd MPEG meeting, Geneva, XP030001643, Jul. 22, 2010, pp. 1-61.
Qualcomm Incorporated, "Adaptive HTTPStreaming: Usage of the 3GPP File Format", 3GPP TSG-SA4 AHI Meeting, SA-AHI172, Mar. 2-4, 2010, Aachen, Germany, XP050437444, pp. 1-8.
Communication dated Sep. 29, 2016, issued by the European Patent Office in counterpart European Application No. 11747701.8.
Qualcomm Incorporated, "Pseudo CR: Adaptive HTTP Streaming—Full Solution Proposal", 3GPP TSG-SA4 #57, S4-100060, Jan. 25-29, 2010, St Julians, Malta, total 17 pages.
Communication dated Sep. 26, 2016, issued by the Japanese Patent Office in counterpart Japanese application No. 2015-146132.
Huawei Technologies Co., Ltd., "Live Content Support in Static HTTP Streaming", 3GPP TSG-SA4 #56, S4-090857, Nov. 9-13, 2009, Sophia-Antipolis, total 6 pages.

(56) References Cited

OTHER PUBLICATIONS

Communication dated Oct. 31, 2016, issued by the Korean Intellectual Property Office in counterpart Korean Application No. 10-2010-0103721.
Open IPTV Forum, Release 1 Specification; vol. 2—Media Formats V1.1, Oct. 8, 2009, pp. 1-22, (22 pages total).
Open IPTV Forum, Release 1 Specification vol. 3—Content Metadata V1.1, Oct. 8, 2009, pp. 1-47, (47 pages total).
Open IPTV Forum, Functional Architecture—V 1.1, Jan. 15, 2008, pp. 1-141, (141 pages total).
Communication dated Oct. 31, 2016, issued by the Korean Intellectual Property Office in counterpart Korean Application No. 10-2010-0103722.
Communication dated Oct. 3, 2016, issued by the Japanese Patent Office in counterpart Japanese Application No. 2012-553824.
Communication dated Nov. 7, 2016, issued by the Japanese Patent Office in counterpart Japanese Application No. 2015-167763.
Final Rejection issued in Japanese Patent Application No. 2015-156368 dated Dec. 19, 2016, along with a certified translation thereof.
Non-Final Rejection issued in Korean Patent Application No. 10-2010-0103725 issued Jan. 19, 2017.
Second Office Action issued in Japanese Patent Application No. 2015-146132 issued on Jan. 24, 2017, along with an English translation thereof.

* cited by examiner

FIG. 4A

```
<Tracks>
    <Track ID="1" Type="Packed" BitRate="200000">
    <Track ID="2" Type="Video" BitRate="400000">
</Tracks>
```

FIG. 4B

```
<RefData Type="HEAD-TS" ID="1">
    <URL>http://www.altova.com/movie1/head1.ref</URL>
</RefData>
<RefData Type="HEAD-TS" ID="2">
    <URL>http://www.altova.com/movie1/head2.ref</URL>
</RefData>
```

FIG. 4C

```
<Fragments NextFragmentsXMLURL="http://www.altova.com/movie1/NextMeta.xml">
    <Fragment StartTime="14:20:00.0Z" Duration="00:00:02.0z" ID="1"
BitRate="200000">
        <URL>http://www.altova.com/movie1/slice1-1.as</URL>
        <RefPointer>1</RefPointer>
    <Fragment StartTime="14:20:00.0Z" Duration="00:00:02.0z" ID="1"
BitRate="400000">
        <URL>http://www.altova.com/movie1/slice2-1.as</URL>
        <RefPointer>2</RefPointer>
</Fragments>
```

FIG. 7

```
<ContentItem>
    <Title xml:lang="en-us">Example</Title>
    <Synopsis xml:lang="en-us">String</Synopsis>
    <OriginSite>http://asexample.com</OriginSite>
    <OriginStateName>Example</OriginSiteName>
    <ContentID>18888</ContentID>
    <ContentURL VideoCoding="AVC" Duration="14:20:00.00" Size="0" MediaFormat="MP4" DRMSystemID="12" MD5Hash=
        "String" MIMIType="video/MP4"TransferType="AS-CoD" AudioCoding="AAC">http://asexample.com/vod/movies/18888/
        Meta/MainMeta.xml</ContentURL>
</ContestItem>
</Contents>
```

FIG. 9A

```xml
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentD}.as</URLTemplate>
    <RefDataURL>http://asexample.com/vod/movies/18888/References/header2.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Audio" Bitrate="64000" StartTime="00:00:00" SegmentDuration="00:00:30" SegmentStartID="1000" SegmentCount="120"/>
    <Track ID="5" Type="I-Frame" Bitrate="500000" StartTime="00:00:00" SegmentDuration="00:00:10" SegmentStartID="1000" SegmentCount="360"/>
</AdaptiveControl>
```

FIG. 9B

```xml
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentD}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" Bitrate="64000" StartTime="10:00:00" SegmentDuration="00:00:30" SegmentStartID="1000" SegmentCount="2"/>
</AdaptiveControl>
```

FIG. 9C

```xml
<AdaptiveControl xsi:noNamespaceSchemaLocation="samsung_as.xsd" xmlns:xsi="http://www.w3.org/2001/XMLSchema-instance">
    <URLTemplate>http://asexample.com/voc/movies/18888/Tracks/Seg{TrackID}-{SegmentID}.as</URLTemplate>
    <NextAdaptiveControlURL>http://asexample.com/ive/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:01:00" SegmentDuration="00:00:06" SegmentStartID="1010" SegmentCount="10"/>
    <Track ID="2" Type="Video" Bitrate="1000000" StartTime="10:01:00" SegmentDuration="0C:00:06" SegmentStartID="1010" SegmentCount="10"/>
    <Track ID="3" Type="Video" Bitrate="2000000" StartTime="10:01:00" SegmentDuration="0C:00:06" SegmentStartID="1010" SegmentCount="10"/>
    <Track ID="4" Type="Audio" Bitrate="64000" StartTime="10:01:00" SegmentDuration="00:00:30" SegmentStartID="1010" SegmentCount="2"/>
</AdaptiveControl>
```

FIG. 9D

```xml
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" Segmen:StartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="360"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9E

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="60"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9F

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:02:00" SegmentDuration="00:00:10" SegmentStartID="1000" SegmentCount="348"/>
    <Track ID="3" Type="Video" Bitrate="2000000" StartTime="00:02:00" SegmentDuration="00:00:10" SegmentStartID="1000" SegmentCount="348"/>
    <Track ID="4" Type="Video" Bitrate="3000000" StartTime="00:02:00" SegmentDuration="00:00:10" SegmentStartID="1000" SegmentCount="348"/>
    <Track ID="5" Type="Video" Bitrate="4000000" StartTime="00:02:00" SegmentDuration="00:00:10" SegmentStartID="1000" SegmentCount="348"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9G

```
<AdaptiveControl xsi:noNamespaceSchemaLocation="samsung_as.xsd" xmlns:xsi="http://www.w3.org/2001/XMLSchema-instance">
    <NextAdaptiveControlURL>http://asexample.com/live/movies/18888/Meta/NextMeta.xml</NextAdaptiveControlURL>
    <Track ID="1" Type="Packed" BitRate="500000">
        <Segment StartTime="00:00:00.00" Duration="00:02:00.00" ID="1000">
            <URL>http://ad_server.com/ad_for_adaptive/ad1.ts</URL>
        </Segment>
    </Track>
</AdaptiveControl>
```

FIG. 9H

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" language="EN" Bitrate="64000" StartTime="10:00:00" SegmentDuration="00:00:30" SegmentStartID="1000" SegmentCount="2"/>
    <Track ID="5" Type="Audio" language="KR" Bitrate="64000" StartTime="10:00:00" SegmentDuration="00:00:30" SegmentStartID="1000" SegmentCount="2"/>
    <Track ID="6" Type="Subtitle" language="EN" Bitrate="0" StartTime="10:00:00" SegmentDuration="00:00:30" SegmentStartID="1000" SegmentCount="2"/>
    <Track ID="7" Type="Subtitle" language="KR" Bitrate="0" StartTime="10:00:00" SegmentDuration="00:00:30" SegmentStartID="1000" SegmentCount="2"/>
</AdaptiveControl>
```

FIG. 15A

| Syntax | No. of bits | Mnemonic |
|---|---|---|
| 1510 — next_RAP_offset() { | | |
| 1511 —     data_field_tag | 8 | uimsbf |
| 1512 —     data_field_length | 8 | uimsbf |
| 1513 —     offset | 16 | bslbf |
| } | | |

FIG. 15B

| Syntax | No. of bits | Mnemonic |
|---|---|---|
| 1520 — next_RAP_offset() { | | |
| 1521 —     data_field_tag | 8 | uimsbf |
| 1522 —     data_field_length | 8 | uimsbf |
| 1523 —     PTS | 33 | uimsbf |
| 1524 —     Ts_index | 16 | uimsbf |
| } | | |

FIG. 17A

| | Syntax | No. of bits | Mnemonic |
|---|---|---|---|
| 1710 — | RAP_index() { | | |
| 1711 — |     data_field_tag | 8 | uimsbf |
| 1712 — |     data_field_length | 8 | uimsbf |
| 1713 — |     RAP_index_finish_flag | 1 | bslbf |
| |     For(i=0;i<n;i++) { | | |
| 1714 — |         PTS | 32 | bslbf |
| 1715 — |         TS_index | 16 | bslbf |
| |     } | | |
| | } | | |

FIG. 17B

| | Syntax | No. of bits | Mnemonic |
|---|---|---|---|
| 1720 — | Segment_RAP_index() { | | |
| 1721 — |     data_field_tag | 8 | uimsbf |
| 1722 — |     data_field_length | 8 | uimsbf |
| 1723 — |     RAP_count | 8 | |
| |     For(i =0; i<RAP_count; i++) { | | |
| 1724 — |         PTS | 33 | uimsbf |
| 1725 — |         TS_index | 16 | uimsbf |
| |     } | | |
| | } | | |

FIG. 17C

```
Segment_index( ){
        Segment_contains_rap (1731)
        Segment_start_with_rap (1732)
        Num_entries (1733)
        For(i=0, i<num_entries;i++){
                Direction (1734)
                reference_type (1735)
                offset_flags (1736)
                if(rerefence_type=='00'){
                        reserved
                }else{
                Rap_size_present_flag (1737)
                if (rap_size_present=='1'){
                        Rap_size (1738)
                }
                }
        }
}
```

FIG. 19

| | Syntax | No. of bits | Mnemonic |
|---|---|---|---|
| 1910 | RAP_index() { | | |
| 1911 | data_field_tag | 8 | uimsbf |
| 1912 | data_field_length | 8 | uimsbf |
| 1913 | AU_index_finish_flag | 1 | bslbf |
| | For(i=0;i<n;i++) { | | |
| 1914 | TS_index | 16 | bslbf |
| 1915 | AU_coding_type_information | 4 | bslbf |
| | } | | |
| | } | | |

FIG. 20

| Syntax | No. of bits | Mnemonic |
|---|---|---|
| next_RAP_offset() { | | |
|     data_field_tag | 8 | uimsbf |
|     data_field_length | 8 | uimsbf |
|     offset | 8 | |
|     dependency_flag (or weighting_flag) | | |
|     viewing_flag | 33 | uimsbf |
|     If( dependency_flag ( or weighting_flag) == 1){ | 16 | uimsbf |
|         dependency (or weighting) | | |
|     } | | |
|     If ( viewing_flag == 1){ | | |
|         viewing | | |
|     } | | |
| } | | |

2010 — next_RAP_offset() {
2011 — dependency_flag (or weighting_flag)
2012 — viewing_flag
2013 — If( dependency_flag ( or weighting_flag) == 1){
2014 — If ( viewing_flag == 1){

FIG. 21

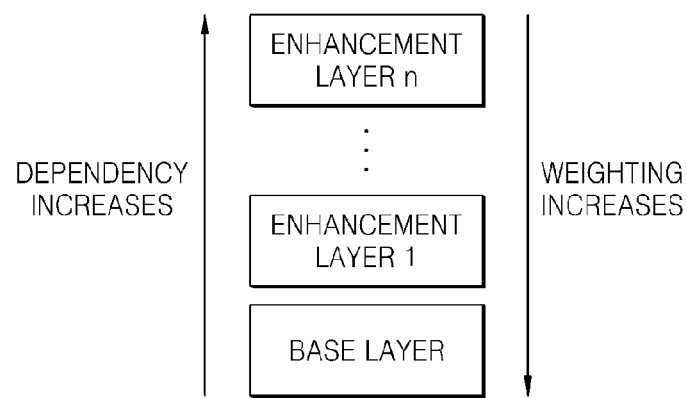

FIG. 24

| Syntax | No. of bits | Mnemonic |
|---|---|---|
| RAP_index() { | | |
| data_field_tag | 8 | uimsbf |
| data_field_length | 8 | uimsbf |
| RAP_index_finish_flag | 1 | bslbf |
| RAP_count | 8 | uimsbf |
| dependency_flag (or weighting_flag) | 1 | bslbf |
| viewing_flag | 1 | bslbf |
| For(i=0;i<RAP_count;i++) { | | |
| PTS | 32 | bslbf |
| TS_index | 16 | bslbf |
| If( dependency_flag ( or weighting_flag) == 1){ | | |
| dependency (or weighting) | 8 | uimsbf |
| } | | |
| If ( viewing_flag == 1){ | | |
| viewing | 8 | uimsbf |
| } | | |
| } | | |
| } | | |

2410 → RAP_index() {

FIG. 25

| Syntax | No. of bits | Mnemonic |
|---|---|---|
| RAP_index() { | | |
|     data_field_tag | 8 | uimsbf |
|     data_field_length | 8 | uimsbf |
|     RAP_index_finish_flag | 1 | bslbf |
|     RAP_count | 8 | uimsbf |
|     dependency_flag (or weighting_flag) | 1 | bslbf |
|     viewing_flag | 1 | bslbf |
|     For(i=0;i< RAP_count;i++) { | | |
|         TS_index | 16 | bslbf |
|         AU_coding_type_information | 4 | bslbf |
|         If( dependency_flag ( or weighting_flag) == 1){ | | |
|             dependency (or weighting) | 8 | uimsbf |
|         } | | |
|         If ( viewing_flag == 1){ | | |
|             viewing | 8 | uimsbf |
|         } | | |
|     } | | |
| } | | |

2510 → RAP_index()

FIG. 26A

```
Adaptation_field()
{
adaptation_field_length
if( adaptation_field_length > 0 )
{
  discontinuity-indicator
  random-access-indicator
  elementary-stream-priority-indicator
  PCR-flag
  OPCR-flag
  splicingpoint-flag
  transport-private-data-flag
  adaptation-field-extension-flag
  if( PCR_flag == '1' ) ...
  if( OPCR_flag == '1') ...
  if( splicing_point_flag == '1') ...

if (transport-private-data-flag == '1') {
    transport-private-data-length
    for (i = 0; i < transport-private-data-length; i++) {
      private-data-byte
    }
  } if( adaptation_field_extension_flag == '1' )...
  for( I = 0 ; I < N ; i++ ) stuffing_byte
}
}
```

FIG. 26B

```
adaptation_field( ) {
    adaptation_field_length
        if(adaptation_field_length>0) {
            discontinuity_indicator
            random_access_indicator
            elementary_stream_priority_indicator
            PCR_flag
            OPCR_flag
            splicing_point_flag
            transport_private_data_flag
            adaptation_field_extension_flag (2611)
                {if (adaptation_field_extension_flag=='1')
                adaptation_field_extension_length
                ltw_flag
                piecewise_rate_flag
                seamless_splice_flag
                seamless_splice_flag
                random_access_point_flag (2612)
                reserved
        }
        if(random_access_point_flag==1!) {
            random_access_point_count (2613)
            for(i=0;i<random_access_point_count;i++) {
                random_access_point_length (2614)
            }
        }
}
```

```
TS_description_section(){
        Table_id (2631)
        Section_syntax_indicator
        '0'
        Reserved
        Section_length
        Reserved
        Version_number
        Current_next_indicator
        Section_number
        Last_section_number
        For(i=0; i<N; i++){
Descriptor() (2632)
}
CRC_32
}
```

FIG. 26E

```
TS_program_map_section() {
table_id
section_syntax_indicator
    '0'
    Reserved
    section_length
    program_number
    reserved
    version_number
    current_next_indicator
    section_number
    last_section_number
    reserved
    PCR_PID
    Reserved
    program_info_length
    for (i=0; i<N; i++) {
        descriptor()
    }
    for (i=0;i<N1;i++) {
        stream_type (2651)
        reserved
        elementary_PID (2652)
        reserved
        ES_info_length
        for (i=0; i<N2; i++) {
            descriptor()
        }
    }
    CRC_32
}
```

METHOD AND APPARATUS FOR TRANSMITTING AND RECEIVING DATA

CROSS-REFERENCE TO RELATED PATENT APPLICATION

This application claims priority from U.S. Provisional Application No. 61/307,093, filed on Feb. 23, 2010, U.S. Provisional Application No. 61/310,104, filed on Mar. 3, 2010, U.S. Provisional Application No. 61/314,233, filed on Mar. 16, 2010, U.S. Provisional Application No. 61/323,536, filed on Apr. 13, 2010, U.S. Provisional Application No. 61/370,970, filed on Aug. 5, 2010, U.S. Provisional Application No. 61/380,461, filed on Sep. 7, 2010, U.S. Provisional Application No. 61/390,170, filed on Oct. 5, 2010, and U.S. Provisional Application No. 61/392,645, filed on Oct. 13, 2010, in the U.S. Patents and Trademark Office, and Korean Patent Application No. 10-2010-0103727, filed on Oct. 22, 2010, in the Korean Intellectual Property Office, the disclosures of which are incorporated herein in their entirety by reference.

BACKGROUND

1. Field

Methods and apparatuses consistent with exemplary embodiments relate to transmitting and receiving data, and more particularly, to a data transmitting and receiving method and apparatus for providing random accessing by using location information indicating a randomly accessible point in a segment included in media data.

2. Description of the Related Art

Examples of a method of transmitting media data through a network include a downloading method and a streaming method. In the streaming method, a server transmits media data in real time, and a client reproduces the received media data in real time.

In general, a client sequentially reproduces media data but cannot sequentially reproduce media data when a user requests trick play or requests jumping to a specific section in the media data. When the media data is not sequentially reproduced, data reproduction should start from reference data, such as an I-frame, which does not refer to other data. Conventionally, a packet corresponding to the start of the I-frame is detected by sequentially detecting all of the packets.

SUMMARY

One or more exemplary embodiments provide a data transmitting and receiving method and apparatus for efficiently providing random accessing by transmitting and receiving location information indicating a randomly accessible point in a segment included in media data.

According to an aspect of an exemplary embodiment, there is provided a method of receiving data, the method including receiving at least one of a plurality of media data generated by encoding content to have different qualities, the plurality of media data each including at least one segment; obtaining location information indicating a randomly accessible point of each of the at least one segment; and providing random accessing on the received media data, based on the location information.

The obtaining the location information may include obtaining location information corresponding to the at least one segment from at least one packet included in the at least one segment.

The location information may include first offset information representing a location of a randomly accessible subsequent packet included in the at least one segment corresponding to the location information.

The location information may include second offset information representing locations of all randomly accessible packets included in the at least one segment corresponding to the location information.

The location information may include third offset information representing locations of all access units in the at least one segment corresponding to the location information.

The location information may further include image type information representing a type of an image frame indicated by the access units.

The location information may include type information regarding the location information, which is categorized according to a manner in which the location information specifies the randomly accessible point.

The location information may include dependency information representing whether a randomly accessible packet in the at least one segment corresponding to the location information, is to be reproduced together with other packets.

The location information may further include representing the total number of packets to be reproduced together with the randomly accessible packet.

The providing random accessing may include obtaining the packets that are to be reproduced together with the randomly accessible packet, based on the location information.

The location information may include three-dimensional (3D) image information indicating whether a randomly accessible packet in the at least one segment corresponding to the location information is to be used to provide a 3D image.

The location information may further include viewpoint information indicating a viewpoint of an image frame provided by the randomly accessible packet.

If the location information is divided and included in a plurality of packets the location information may further include end information indicating whether a current packet is a last packet that includes the location information.

The at least one media data may be encoded according to the MPEG 2 standard, and the location information may be obtained from location information from at least one from among a 'private_data_bytes' field of the at least one packet.

The at least one media data may be encoded according to the MPEG 4 standard, and the location information may be obtained from at least one from among a 'moov' box and a 'moof' box.

According to another aspect of an exemplary embodiment, there is provided a method of transmitting data, the method including obtaining a plurality of media data generated by encoding content to have different qualities, the plurality of media data each including at least one segment; generating location information indicating a randomly accessible point of each of the at least one segment; and transmitting the location information.

According to another aspect of an exemplary embodiment, there is provided an apparatus for receiving data, the apparatus including a receiver which receives at least one a plurality of media data generated by encoding content to have different qualities, the plurality of media data each including at least one segment; an obtaining unit which obtains location information indicating a randomly accessible point of each of the at least one segment; and a providing unit which provides random accessing on the received media data, based on the location information.

According to another aspect of an exemplary embodiment, there is provided an apparatus for transmitting data, the apparatus including an obtaining unit which obtains a plurality of media data generated by encoding content to have different qualities, the plurality of media data each including at least one segment; a generation unit which generates location information indicating a randomly accessible point of each of the at least one segment; and a transmission unit which transmits the location information.

BRIEF DESCRIPTION OF THE DRAWINGS

The above and other features will become more apparent by describing in detail exemplary embodiments thereof with reference to the attached drawings in which:

FIG. 4A illustrates information for defining a plurality of media data, according to an exemplary embodiment;

FIG. 4B illustrates information about a header of media data, according to an exemplary embodiment;

FIG. 4C illustrates information about at least one segment included in each of a plurality of media data, according to an exemplary embodiment;

FIG. 7 illustrates information about content according to an exemplary embodiment;

FIGS. 9A through 9H illustrate media presentation descriptions according to exemplary embodiments;

FIGS. 15A and 15B are tables each illustrating a first type of location information, according to exemplary embodiments;

FIGS. 17A and 17B are tables each illustrating a second type of location information according to exemplary embodiments;

FIG. 17C illustrates location information according to an exemplary embodiment;

FIG. 19 is a table illustrating a third type of location information according to an exemplary embodiment;

FIG. 20 is a table illustrating a first type of location information according to another exemplary embodiment;

FIG. 21 illustrates scalable image data according to an exemplary embodiment;

FIG. 24 is a table illustrating a second type of location information according to another exemplary embodiment;

FIG. 25 is a table illustrating a third type of location information according to another exemplary embodiment;

FIGS. 26A, 26B, and 26C each illustrate location information according to other exemplary embodiments;

FIGS. 26D and 26F illustrate a TS packet according to exemplary embodiments;

FIG. 26E illustrates the structure of a 'TS_program_map_section' according to an exemplary embodiment;

DETAILED DESCRIPTION

Hereinafter, exemplary embodiments will be described in detail with reference to the accompanying drawings.

For convenience of description, the terminologies used herein will now be simply defined. Examples of content include audio information, video information, audio-video information and data. A content item may include a plurality of components that will be described later.

A component is a constituent of the content item such as audio information, video information, and subtitle information. For example, the component may be a subtitle stream written in a predetermined language, or a video stream obtained at a predetermined camera angle. The component may be referred to as a track or an elementary stream (ES) according to a container.

A content resource (e.g., various qualities, various bit rates, and various angles) is a content item that is provided from a plurality of representations in order to perform an adaptive stream on a content item. A service searching process may be referred to as the content resource. The content resource may include periods of at least one continuous time.

A period is a temporal section of the content resource.

A representation is a version (all components, or some components) of a content resource in a period. A plurality of representations may have different subsets of components, or different encoding parameters (e.g., a bit rate) of components. Throughout this specification, representation is referred to as media data, but may be referred to as any terminology for indicating data including at least one component.

A segment is a temporal section of representation indicated by a content uniform resource locator (URL) in a predetermined system layer format (TS or MP4).

Hereinafter, exemplary embodiments will be described more fully with reference to the accompanying drawings.

Figure 1:
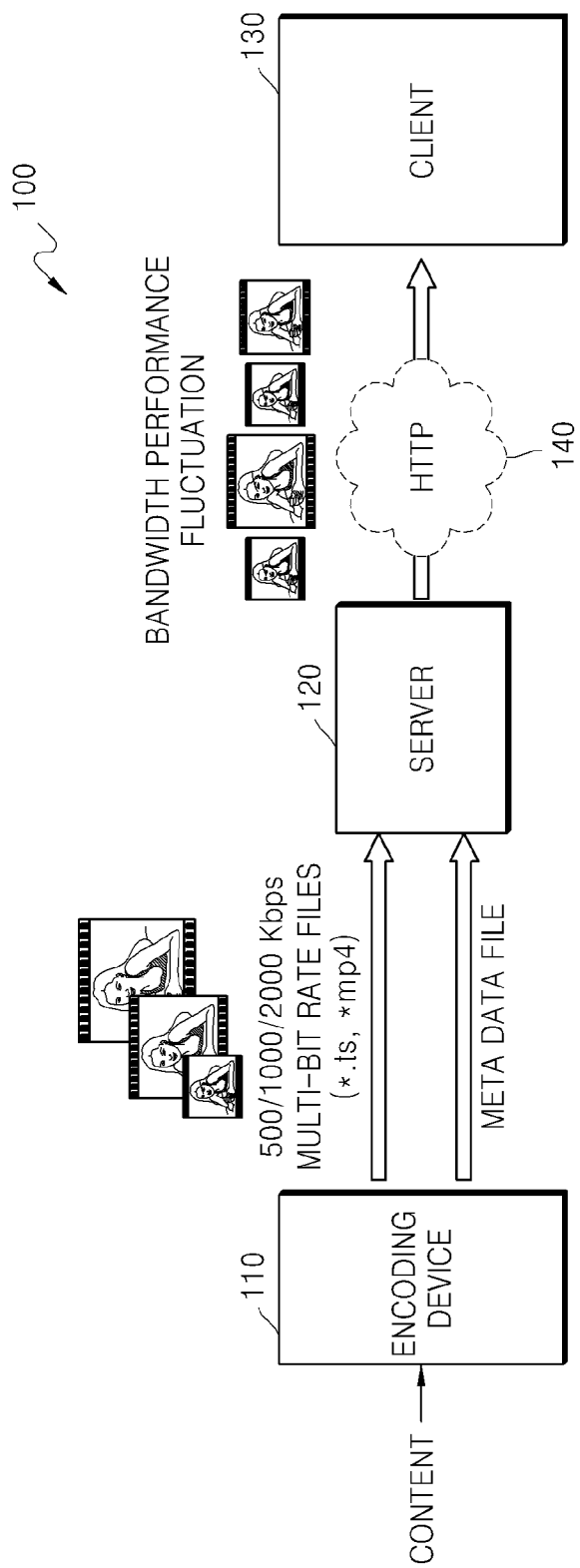
FIG. 1 is a diagram of a streaming system according to an exemplary embodiment.

FIG. 1 is a diagram of a streaming system 100 according to an exemplary embodiment. Referring to FIG. 1, the streaming system 100 according to the exemplary embodiment includes an encoding device 110, a server 120, and a client 130.

The encoding device 110 generates a plurality of media data about one input content by encoding the input content to have a plurality of different qualities. A streaming environment may change when the server 120 streams media data to the client 130. For example, a bandwidth of a network 140 for streaming may be changed, or a hardware source that may be used by the server 120 to transmit media data or by the client 130 to receive media data may be changed.

Accordingly, the encoding device 110 encodes one content to have different qualities for adaptive streaming according to a fluidic streaming environment. One content may be encoded to have different qualities by adjusting a factor, such as a bit rate, a sampling frequency, resolution, or a frame rate. For example, a plurality of media data in 500 Kbps, 1000 Kbps, and 2000 Kbps may be generated by encoding one image content in different resolutions.

The plurality of media data in different qualities are transmitted to the server 120, and at this time, information about the content and information about each media data may also be transmitted to the server 120. The information about the content may include information about a title, a synopsis, a content identifier (ID), and a content uniform resource locator (URL) of the content as meta data of the content. The information about each media data may include a quality, a type, an ID, or the like of each media data, and will be described in detail with reference to FIGS. 4A through 4C.

The client 130 receives at least one of the information about content and information about each media data, and requests the server 120 for at least one of the plurality of media data, based on the received at least one of the information about content and information about each media data. The client 130 estimates a streaming environment, and selects at least one of the plurality of media data based on the estimated streaming environment. The at least one media data that may maintain a suitable quality of service (QoS) in the estimated streaming environment may be selected. Then, the client 130 may transmit a hypertext transfer protocol (HTTP) request for requesting the server 120 to transmit the selected at least one media data.

When a streaming environment is deteriorated and high quality media data is received but continuous reproduction of media data is not possible, low quality media data may be requested from among a plurality of media data. When a streaming environment is improved and high quality media data is received and continuous reproduction of media data is possible, the high quality media data may continue to be requested from among a plurality of media data.

The client 130 may request the server 120 to transmit other media data while receiving a predetermined media data. For example, the client 130, which requested and was receiving first media data that is of low quality in a deteriorated streaming environment, may request the server 120 to transmit second media data that is of a higher quality than the first media data as the streaming environment improves. According to a conventional streaming method, when the server 120 and the client 130 set a quality while initially setting a streaming channel, media data is continuously transmitted and received having the same quality. However, according to the exemplary embodiment, streaming that is adaptive to the streaming environment is possible since the client 130 is able to request the second media data again even while receiving the first media data about the same content.

The client 130 may estimate a streaming environment by using any method of estimating a streaming environment based on the bandwidth of the network 140 or the hardware resource that may be used by the server 120 or the client 130. For example, the client 130 may estimate the streaming environment based on a time stamp and a bit error rate (BER) of received media data. The streaming environment may be determined to be deteriorated when media data is received slower than a reproduction speed by checking time stamps of the received media data. Alternatively, the streaming environment may be determined to be deteriorated when BERs of the received media data are increased.

When the client 130 requests the server 120 to transmit at least one of the media data according to the streaming environment, the server 120 transmits requested media data to the client 130. The server 120 may transmit the requested media data to the client 130 as an HTTP response to the HTTP request.

Each media data may include at least one of a plurality of segments generated by encoding content in different qualities and dividing the encoded content. In other words, each media data generated by encoding the content by the encoding device 110 may include at least one segment divided based on time. The server 120 transmits the content by dividing the content into the plurality of segments and respectively transmits the plurality of segments, instead of encoding the content in one stream and continuously transmitting the content. The plurality of segments may be generated by dividing the content into predetermined time units, such as units of 10 or 20 seconds. The time that is the basis for dividing the content may be set based on a group of pictures (GOP). Media data corresponding to pictures of one or more GOPs may be set as one segment.

For example, when content is streamed having two qualities, the first media data may include at least one segment generated by encoding the content to have a first quality and dividing the encoded content based on time, and the second media data may include at least one segment generated by encoding the content to have a second quality and dividing the encoded content based on time.

The adaptive streaming is possible by dividing each media data based on time. For example, when streaming starts, the server 120 transmits a segment corresponding to 0 to 20 seconds of the first media data that is of low quality. Then, when it is determined that the streaming environment is improved after 20 seconds and the client 130 requests media data that is of higher quality, the server 120 may transmit a segment corresponding to 20 to 40 seconds of the second media data that is of the high quality. Since media data is divided into a plurality of segments based on time, segments of different media data may be transmitted according to a streaming environment, even during streaming.

Figure 2A:
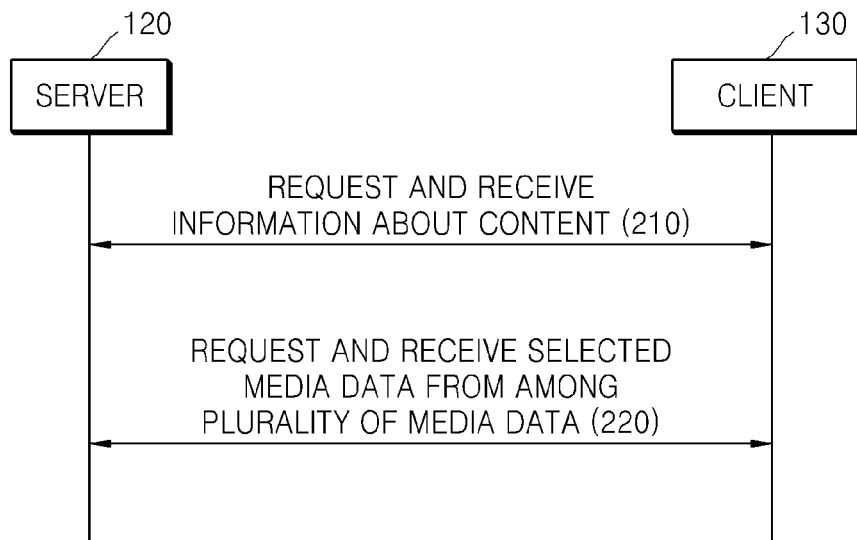
FIGS. 2A and 2B are flowcharts for describing streaming methods according to exemplary embodiments.

FIG. 2A is a flowchart for describing a streaming method according to an exemplary embodiment. Referring to FIG. 2A, the client 130 transmits a request to the server 120 to transmit information about predetermined content, in operation 210. When a user of the client 130 selects the predetermined content from a user interface displayed on a screen of the client 130, the client 130 requests the server 120 to transmit information about the selected content. The client 130 may transmit an HTTP request requesting the server 120 to transmit information about predetermined content.

Upon receiving the request from the client 130, the server 120 transmits the information about the predetermined content to the client 130. The server 120 may transmit the information about the predetermined content as an HTTP response to the HTTP request to the client 130. The information about the predetermined content may be a content access descriptor (CAD) according to an open IPTV forum (OIPF) standard. The information about the predetermined content will now be described in detail with reference to FIG. 3.

Figure 3:
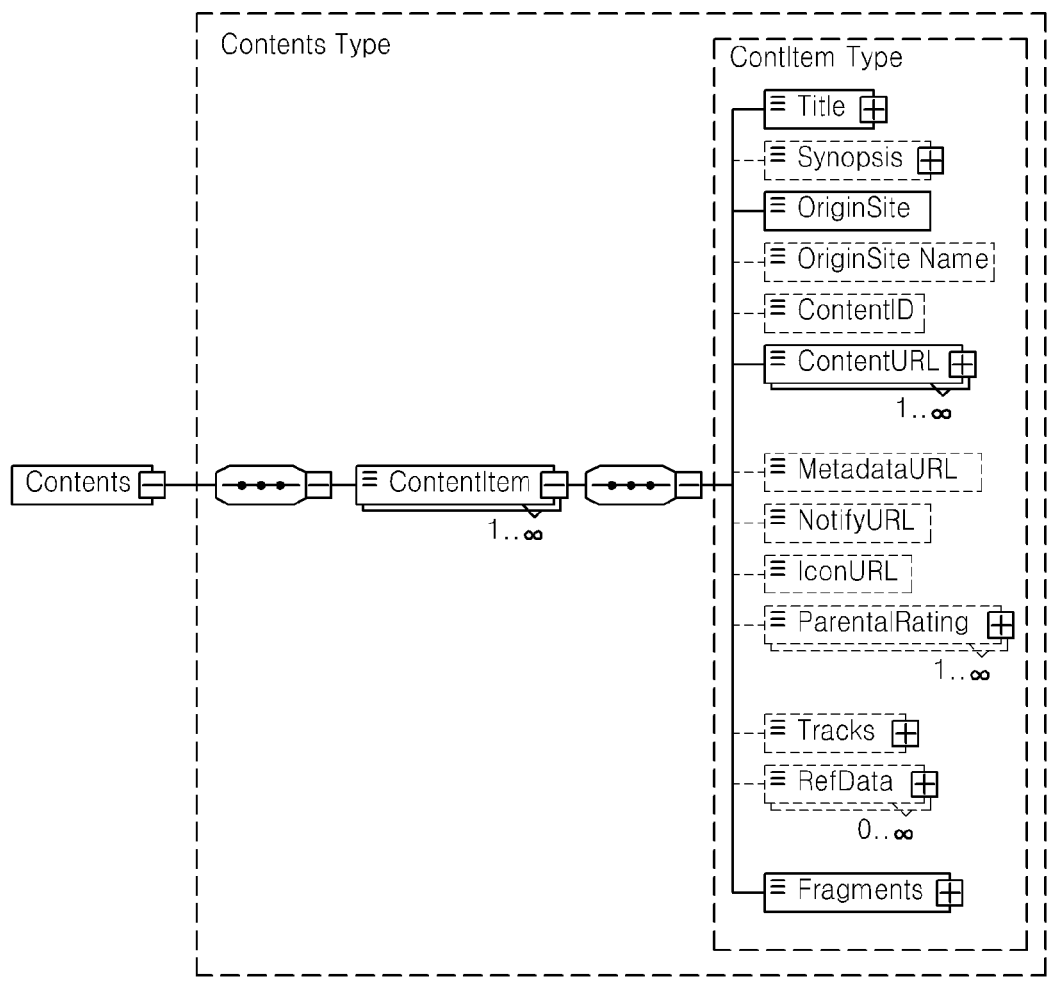
FIG. 3 is a schema of a file including information about content, according to an exemplary embodiment.

FIG. 3 is a schema of a file including information about content, according to an exemplary embodiment. The file may be a CAD, and may be an eXtensible Markup Language (XML) file. A tag and an attribute are separately described, but it would be obvious to one of ordinary skill in the art that an item defined by a tag can be defined by an attribute, or an item defined by an attribute can be defined by a tag.

Referring to FIG. 3, the information about content may include "Title", "Synopsis", "OriginSite", and "ContentURL" tags.

Since conventional streaming of media data generates one media data by encoding one content to have a predetermined quality, conventional information (specifically, CAD according to OIPF) about content does not include information about a plurality of media data generated by encoding the content to have different qualities.

However, the information about content, according to the exemplary embodiment, includes information about a plurality of media data generated by encoding one content to have different qualities, and corresponds to "Tracks", "RefData", and "Fragments" tags in FIG. 3.

FIG. 4A illustrates information for defining a plurality of media data, according to an exemplary embodiment. Referring to FIG. 4A, a "Tracks" tag is information for classifying a plurality of media data generated by encoding content to have different qualities. The "Tracks" tag includes an "ID" attribute, a "Type" attribute, and a "Bitrate" attribute assigned to each media data.

The "ID" attribute defines identifiers sequentially given to the plurality of media data, and the "Type" attribute defines whether media data corresponds to audio data, video data, video/audio data, or subtitle data. When the "Type" attribute is "Packed", the media data is video/audio data, and when the "Type" attribute is "Video", the media data is video data. The "Bitrate" attribute defines a bit rate used to encode the media data.

FIG. 4B illustrates information about a header of media data, according to an exemplary embodiment. Referring to FIG. 4B, a "RefData" tag includes a "Type" attribute and an "ID" attribute. The "Type" attribute defines a media format of a header. For example, when the "Type" attribute is "HEAD-TS", the header is a header of a transport stream format. The "ID" attribute defines a media data of a header. When the "ID" attribute is "1", the header is a header of media data having a media data ID of "1". Also, the "RefData" tag includes information pointing to a header, and a "URL" tag defines a location of a header, i.e., a URL of a header.

The "RefData" tag is a selective element. The "RefData" tag is included in information about content only when a header is separated from media data and exists as a separate file, and may not be included in the information about content when the header is combined with the media data.

FIG. 4C illustrates information about at least one segment included in each of a plurality of media data, according to an exemplary embodiment. Referring to FIG. 4C, a "Fragment" tag, which is a sub tag of a "Fragments" tag, includes information about at least one segment included in each of the plurality of media data.

The "Fragments" tag includes a "NextFragmentsXMLURL" attribute. When following content is continuously streamed after streaming of one content is completed like in the case of live streaming, the following content may be seamlessly streamed only when the client 130 is aware of information about the following content. Accordingly, the "Fragments" tag defines the information about the following content as the "NextFragmentsXMLURL" attribute. URLs of the plurality of media data with respect to the following content may be defined as the "NextFragmentsXMLURL" attribute.

The "Fragment" tag includes information about at least one segment of current content. Referring to FIG. 4C, URL information of "slice1-1.as" constituting a first segment generated by encoding content in a first quality as first media data is defined by a "URL" tag, and an ID of a corresponding header is defined by a "RefPointer" tag. Also, a starting time of the first segment is defined by a "StartTime" attribute, and a duration time of each segment is defined by a "Duration" attribute. A quality of the first media data is defined by a "BitRate" attribute.

In FIG. 4C, the "Fragments" tag shows each media data including only one segment. However, as described above with reference to FIG. 1, it would be obvious to one of ordinary skill in the art that when each media data is divided into a plurality of segments, one "Fragments" tag may include information about at least two segments.

Referring back to FIG. 2A, the client 130 requests the server 120 to transmit at least one of the plurality of media data, in operation 220. The plurality of media data are generated by encoding one content to have different qualities. The client 130 selects at least one media data encoded to have a quality suitable for a streaming environment from among the plurality of media data, and requests the server 120 for the selected at least one media data. The client 130 may transmit an HTTP request to the server 120 based on information about the plurality of media data, which is included in the information about the content.

As described with reference to FIG. 4C, the information about the content may include a "Fragments" tag. Accordingly, the client 130 requests the server 120 to transmit selected media data based on URL information included in the "Fragments" tag.

The server 120 transmits the media data according to the request of the client 130. The server 120 may transmit at least one segment of the requested media data to the client 130. The server 120 may transmit media data requested as an HTTP response with respect to an HTTP request to the client 130.

Figure 2B:
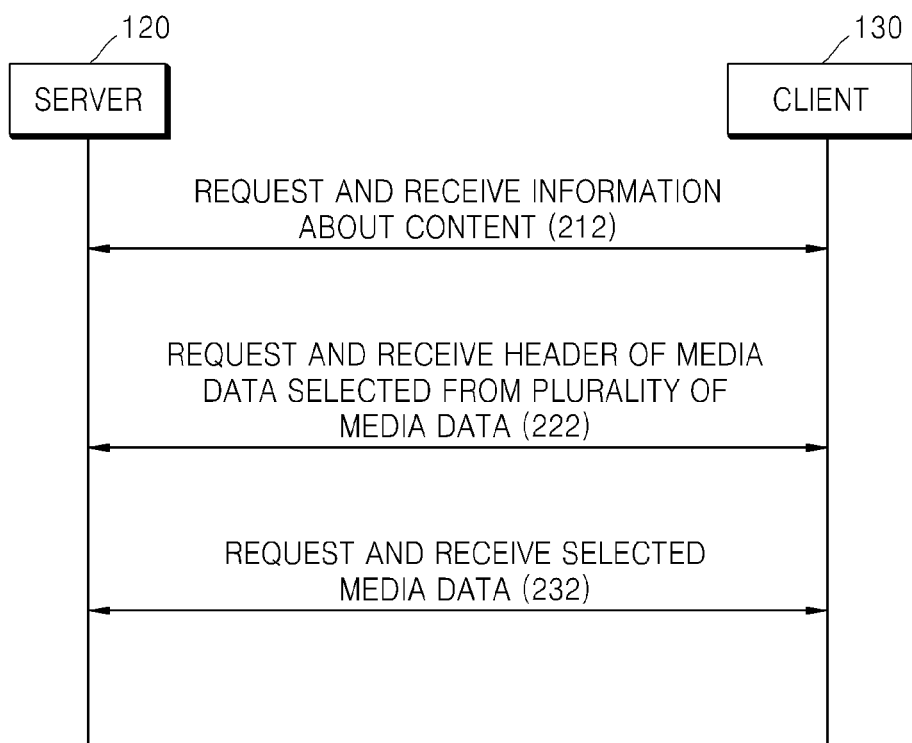

FIG. 2B is a flowchart for describing a streaming method according to another exemplary embodiment. FIG. 2B illustrates the streaming method when a header exists as a separate file from media data.

Referring to FIG. 2B, in operation 212, the client 130 requests the server 120 to transmit information about predetermined content and the server 120 transmits the information about content. Operation 212 corresponds to operation 210 of FIG. 2A. The information about content including the "RefData" tag described above with reference to FIG. 4B is received.

In operation 222, the client 130 requests a header of selected media data from among a plurality of media data, based on the information about content received in operation 212. At least one media data suitable for a streaming environment is selected from among the plurality of media data based on the information about content received in operation 212, and a header of the selected at least one media data is requested. The header of the selected at least one media data is requested by referring to the "RefData" tag included in the information about content received in operation 212.

The server 120 transmits the requested header to the client 130. A header file may be transmitted to the client 130, and may be an XML file.

In operation 232, the client 130 requests the server 120 to transmit selected media data based on the information about content received in operation 212 and the header received in operation 222. The client 130 requests the server 120 to transmit at least one segment generated by dividing media data based on time, and the server 120 transmits the requested at least one segment to the client 130.

Figure 5A:
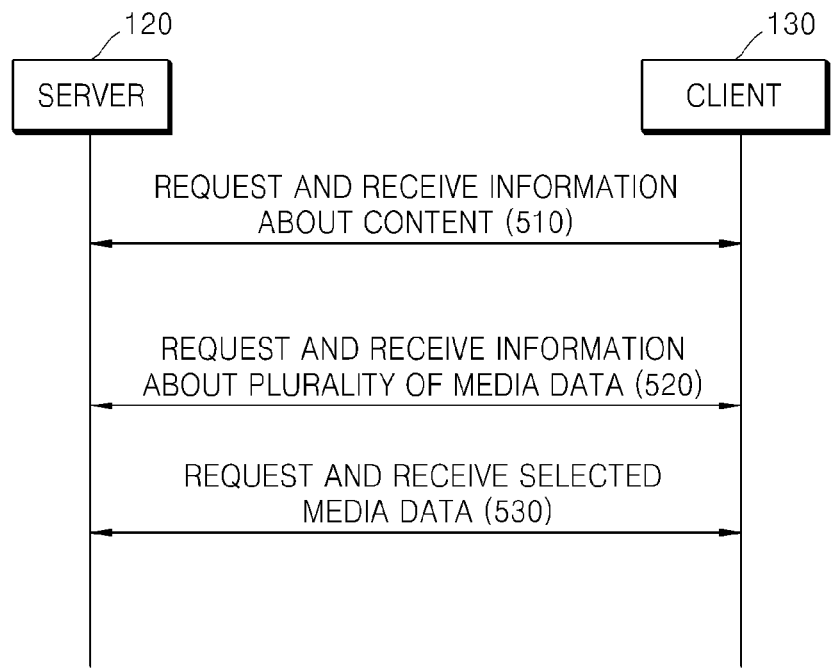
FIGS. 5A and 5B are flowcharts for describing streaming methods according to other exemplary embodiments.

FIG. 5A is a flowchart for describing a streaming method according to another exemplary embodiment. Referring to FIG. 5A, the client 130 requests the server 120 to transmit information about predetermined content, in operation 510, and the server 120 transmits the information about content. The client 130 transmits an HTTP request for requesting the server 120 to transmit the information about content, and receives the information about content as an HTTP response to the HTTP request. The information about content may be an XML file. The information about content received by the client 130 in operation 510 is different from the information about content received by client 130 in operation 210 of FIG. 2, and the difference will now be described with reference to FIGS. 6 and 7.

Figure 6:
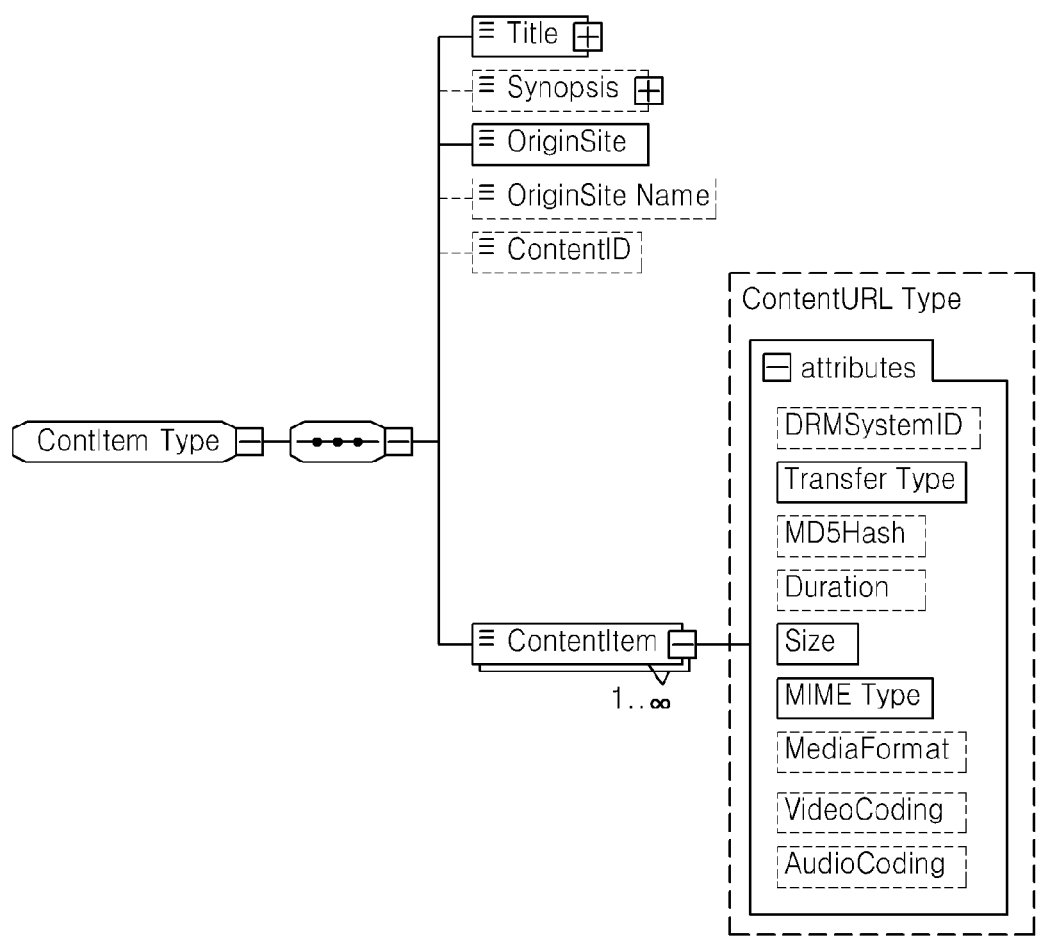
FIG. 6 is a schema of a file including information about content, according to another exemplary embodiment.

FIG. 6 is a schema of a file including information about content, according to another exemplary embodiment. Referring to FIG. 6, the information about content according to the exemplary embodiment may include "Title", "Synopsis", "OriginSite", and "ContentURL" tags like FIG. 3.

However, in the previous exemplary embodiment of FIG. 3, the information about content includes the information about the plurality of media data by including the "Tracks", "RefData", and "Fragments" tags, whereas in the current exemplary embodiment of FIG. 6, instead of including the information about the plurality of media data, the information about content only defines a URL of a file (hereinafter, referred to as a media presentation description) including the information about the plurality of media data. The "ContentURL" tag may define the URL of the media presentation description.

Compatibility with various media data formats may be maintained while performing streaming that is adaptive to a streaming environment by inserting the URL of the media presentation description into the information about content as shown in FIG. 6, without largely changing conventional schema of the file containing the information about content.

As shown in FIG. 6, the information about content may only include information related to the streaming method, and not include the information about the plurality of media data. In other words, the "ContentURL" tag may include a "MediaFormat" attribute defining a format of media data used during streaming, and a "MIMEType" attribute defining a type of media data.

Specifically, the "ContentURL" tag may include a "TransferType" attribute defining a service to which streaming of content is related. The "TransferType" attribute may define whether the streaming of content is related to a Content on Delivery (CoD) service, a live service, an adaptive streaming live service, or an adaptive streaming CoD service.

FIG. 7 illustrates information about content according to an exemplary embodiment. The information illustrated in FIG. 7 may be a CAD according to the OIPF standard. Referring to FIG. 7, the information about content generated according to the schema of FIG. 6 may define a URL of a media presentation description in a "ContentURL" tag. http://asexample.com/vod/movies/18888/Meta/Main-Meta.xml is the URL of the media presentation description. Also, as described with reference to FIG. 6, the "MediaFormat" attribute, the "MIMEType" attribute, and the "TransferType" attribute may be defined in the "ContentURL" tag.

Referring back to FIG. 5A, in operation 520, the client 130 requests the server 120 for the information about the plurality of media data, based on the information about content received in operation 510. The client 130 may request a media presentation description to the server 120 through an HTTP request, and may receive the media presentation description as an HTTP response.

The information about content received by the client 130 from the server 120 in operation 510 may include the URL of the media presentation description as described with reference to FIGS. 6 and 7, and thus the client 130 requests and receives the media presentation description from the server 120 by referring to the "ContentURL" tag of the information about content. The media presentation description will now be described in detail with reference to FIGS. 8A and 8B, and FIGS. 9A through 9H.

Figure 8A:
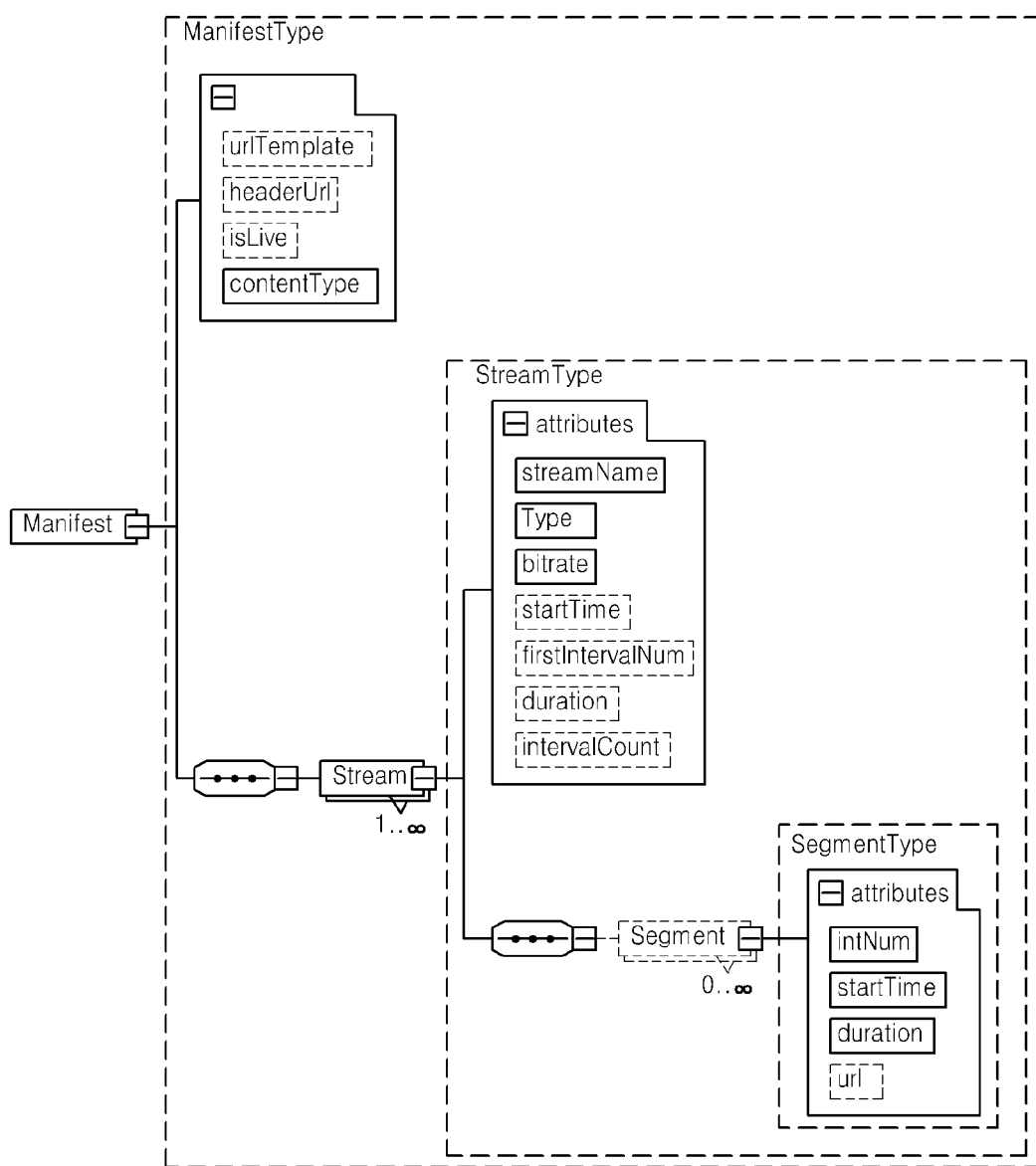
FIGS. 8A and 8B are schemas of a media presentation description according to exemplary embodiments.
Figure 8B:
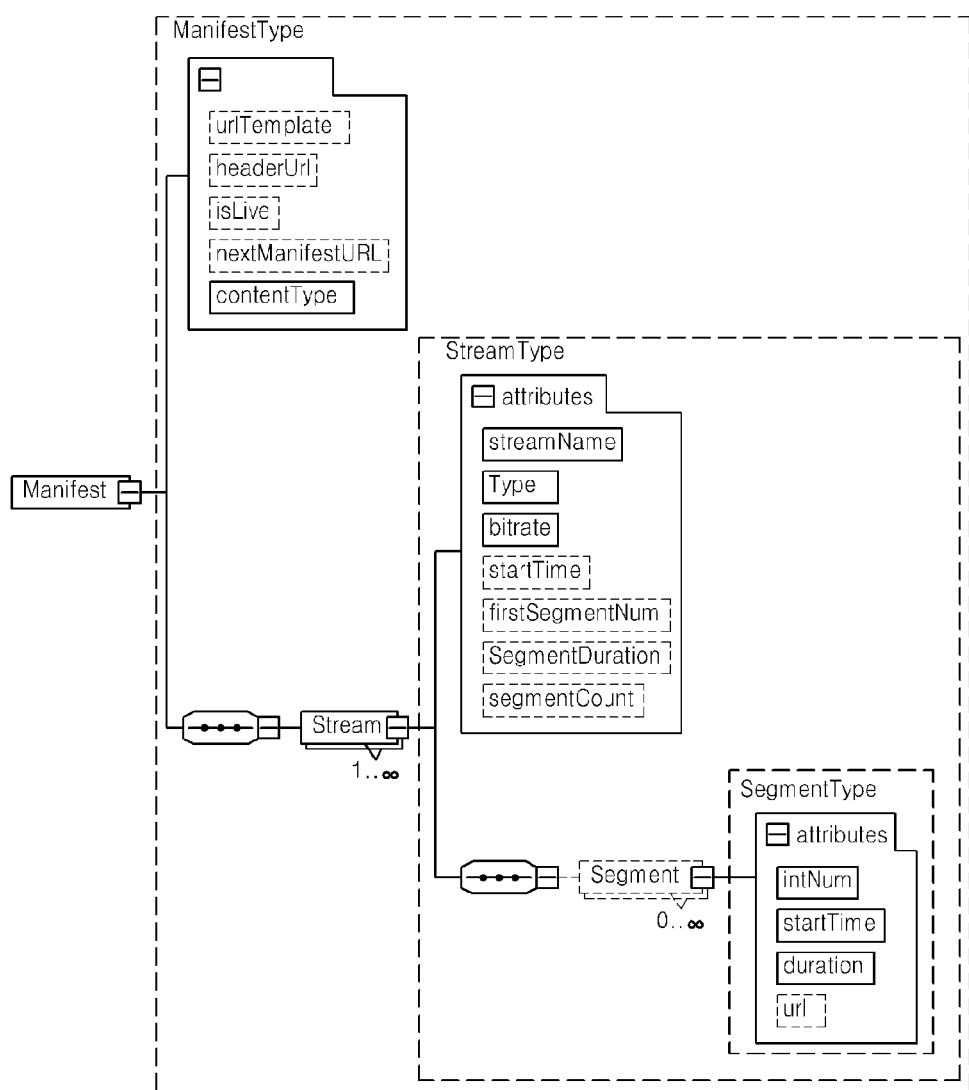

FIGS. 8A and 8B are schemas of a media presentation description according to exemplary embodiments. The media presentation description may comply with the OIPF standard. Referring to FIG. 8A, the media presentation description according to the current exemplary embodiment includes a template tag about URLs of a plurality of media data, a tag for defining a location of a header, a tag for defining to which service the streaming is related to, a tag for defining a container format of media data, and a tag for defining the plurality of media data.

A "urlTemplate" tag defines a common portion of the URLs of the plurality of media data. For example, if "http://example.com/vod/movie/18888/Track/{TrackID}/Segments/{SegmentID}" is a URL template, a URL of media data may be defined by respectively substituting an ID of each media data and an ID of at least one segment included in each media data for "TrackID" and "SegmentID".

A "headerUrl" tag corresponds to the "RefData" tag described with reference to FIG. 4B. In other words, the "headerUrl" tag defines URLs of headers of the plurality of media data.

An "isLive" tag defines a service related to streaming. For example, when the "isLive" tag is defined as "Live", the streaming is related to a live service, and when the "isLive" tag is defined as "CoD", the streaming is related to a CoD service.

A "contentType" tag defines a container format of media data used during streaming. The "contentType" tag may indicate whether the container format is an MP4 format or an MPEG2-transport stream (TS) format. The container format is an MP4 format or an MPEG2-TS format herein. However, it would be obvious to one of ordinary skill in the art that the container format is not limited thereto, and any container format for transmitting media data may be used. For example, the "contentType" tag may define that the container format complies with an MPEG Media Transport (MMT) standard.

A "Stream" tag is generated for each media data and defines each media data. In order to define each media data generated by encoding one content to have different qualities, the "Stream" tag includes a "streamName" attribute, a "Type" attribute, a "bitrate" attribute, a "startTime" attribute, a "firstIntervalNum" attribute, a "duration" attribute, and an "intervalCount" attribute.

The "streamName" attribute defines a name of media data, and may be an ID of media data. The "Type" attribute defines a type of media data, where it is defined whether the media data is audio data, video data, or audio/video data. When media data only includes data about an I-frame for a trick play, such information may be defined in the "type" attribute.

The "bitrate" attribute defines a bit rate of media data, the "startTime" attribute defines a time stamp for specifying a starting time of media data, and the "firstIntervalNum" attribute defines a number of a segment that initially starts.

The "duration" attribute defines a duration time of a segment included in media data, and the "intervalCount" attribute defines a total number of at least one segment included in media data.

The "Segment" tag is a sub tag of the "Stream" tag, and as described above, when media data includes at least one segment generated by encoding content in a predetermined quality and dividing the encoded content based on time, each of the at least one segment is defined.

The "IntNum" attribute defines a number of a segment, and the "StartTime" tag defines a starting time of a corresponding segment. The "Duration" tag defines a duration time of a corresponding segment, and the "url" attribute defines a URL of a corresponding segment.

The "Segment" tag is a selective tag, and may not be included in the media presentation description if the information about at least one segment included in the media data can be inferred from other attributes of the "Stream" tag. In other words, when content of the "Segment" tag can be inferred from the "startTime", "firstIntervalNum", "duration", and "intervalCount" attributes defined in the "Stream" tag, the "Segment" tag may not be included in the media presentation description. Also, a "url" attribute of the "Segment" tag may not be required if a predetermined template is defined in the "urlTemplate", and the URLs of segments are inferred by substituting each ID of the plurality of media data and an ID of at least one segment included in each media data with the defined predetermined template.

However, on the other hand, attributes of the "Segment" tag are separately defined for each segment, if the attributes of the "Segment" tag cannot be inferred from other attributes of the "Stream" tag. The attributes of the "Segment" tag may not be inferred if duration times of segments are different. When duration times are different, the duration times of segments included in media data cannot be inferred from the attributes of the "Stream" tag, and thus the duration times of the segments may be each set by using a "duration" attribute of the "Segment" tag. When the duration times of the segments are different, starting times of continuous segments are also different. For example, when a duration time of a first segment of first media data is different from a duration time of a second segment of the first media data, a starting time of the second segment and a starting time of a third segment cannot be inferred from the "Stream" tag. Accordingly, a starting time of each segment may be defined by a "startTime" attribute.

The duration times and/or starting times may be defined by using a sub tag of the "Segment" tag, instead of using the "duration" attribute and the "startTime" attribute of the "Segment" tag. For example, a "Url" tag constituting a sub tag of the "Segment" tag may be set, and a duration time may be defined as an attribute of the "Url" tag, such as "<Url=www.example.com/~/segment.ts, duration=10/>".

According to another exemplary embodiment, duration time may be defined based on a difference between duration times of continuous segments. An upper tag may define a default duration time, and the "Url" tag constituting the sub tag may define only a difference between the default duration time and an actual duration time for each segment. As described above, the "Url" tag constituting the sub tag of the "Segment" tag may be defined as "<Url=www.example.com/~/segment.ts, duration=difference/>". "Difference" denotes a difference between the default duration time and the actual duration time.

When a default duration time of a corresponding segment is defined to be 10 minutes by using the "Stream" tag or the "Segment" tag, and the "Url" tag constituting the sub tag is defined to be "<Url=www.example.com/~/segment.ts, duration=2/>", a duration time of the corresponding segment may be defined to be 10+2=12 minutes.

Referring to FIG. 8B, the media presentation description according to another exemplary embodiment may further include a "nextManifestURL" tag. As described above, when following content is continuously streamed after streaming of one content is completed, such as in the case of live streaming or advertisement insertion, the client 130 requires to know information about the following content in advance so as to stream the following content seamlessly. Accordingly, a URL of a media presentation description of the following content to be streamed after current content may be defined by the "nextManifestURL" tag.

FIGS. 9A through 9H illustrate media presentation descriptions according to exemplary embodiments. Referring to FIG. 9A, the media presentation description according to an exemplary embodiment includes a "URLTemplate" tag, a "RefDataURL" tag, and a plurality of tags respectively defining a plurality of media data.

The "URLTemplate" tag and the "RefDataURL" tag of FIG. 9A respectively correspond to the "urlTemplate" tag and the "RefDataURL" tag of FIGS. 8A and 8B.

An "ID" attribute, a "Type" attribute, a "BitRate" attribute, a "StartTime" attribute, a "SegmentDuration" attribute, a "SegmentStartID" attribute, and a "SegmentCount" attribute of FIG. 9A respectively correspond to the "streamName" attribute, the "type" attribute, the "bitrate" attribute, the "startTime" attribute, the "duration" attribute of the "Stream" tag, the "firstIntervalNum" attribute of the "Stream" tag, and the "intervalCount" attribute of FIGS. 8A and 8B.

The media presentation description of FIG. 9A includes information about three video data generated by encoding content to have different qualities, information about one audio data, and information about media data generated by encoding only I-frames for a trick play.

Referring to FIG. 9B, the media presentation description according to an exemplary embodiment further includes a "NextAdaptiveControlURL" tag. The "NextAdaptiveControlURL" tag corresponds to the "nextManifestURL" tag of FIG. 8B. Accordingly, a URL of a media presentation description of following content to be reproduced after current content may be defined by the "NextAdaptiveControlURL" tag.

FIG. 9C shows a media presentation description of the following content, when the URL of the media presentation description of the following content to be reproduced after the current content is defined by the "NextAdaptiveControlURL" tag of FIG. 9B. Comparing the media presentation descriptions of FIGS. 9B and 9C, a "StartTime" attribute is different from the media presentation description of the current content of FIG. 9B, since the media presentation description of FIG. 9C is for the following content.

FIGS. 9D and 9E illustrate media presentation descriptions for selectively controlling a high quality video reproduction that a user want to perform. FIG. 9D illustrates the media presentation description when a plurality of media data are generated by encoding one content to have five different qualities. Here, the media presentation descriptions of FIGS. 9D and 9E are different in a tag including information about video encoded to have high quality, i.e., a "StartTime" attribute and a "SegmentCount" attribute of media data having an "ID" attribute of "5".

The server 120 selectively transmits the media presentation description of FIG. 9D or the media presentation description of FIG. 9E according to a user rating of the client 130. When the user rating of the client 130 is high (for example, when the client 130 is a paid user), the media presentation description of FIG. 9D is transmitted so that high quality video is freely reproduced, and when the user rating of the client 130 is low (for example, when the client 130 is a free user), the media presentation description of FIG. 9E is transmitted so that segments defined by the "SegmentCount" attribute are reproduced from a time defined by the "StartTime" attribute in high quality video.

FIG. 9F illustrates a media presentation description when an advertisement is inserted into content. Referring to FIG. 9F, the media presentation description may include information about advertisement content and main content, which have different "StartTime" attributes. The media presentation description may include information about advertisement content, which is reproduced from "00:00:00" to "00:02:00" at a bit rate of "500000", and information about main content, which is reproduced from "00:02:00" at bit rates of "1000000", "2000000", "3000000", or "4000000". The media presentation description of FIG. 9F may be transmitted from the server 120 to the client 130 if the server 120 provides the advertisement content to the client 130 by encoding the advertisement content to have one bit rate, and provides the main content, which have a different "StartTime" attribute from the advertisement content, to the client 130 by encoding the main content in four different bit rates.

FIG. 9G illustrates a media presentation description including information about advertisement content, according to an exemplary embodiment. A server for providing main content and a server for providing advertisement content may be different. In other words, when the client 130 receives the main content from the server 120 of FIG. 5A and receives the advertisement content from a server other than the server 120, the media presentation description of FIG. 9G may include a URL of the advertisement content. As shown in FIG. 9G, the media presentation description may include the URL of the advertisement content that is encoded to have one quality.

FIG. 9H illustrates a media presentation description including language and subtitle information, according to an exemplary embodiment. Referring to FIG. 9H, audio data may include information about multiple languages. The media presentation description may include information about audio data of multiple languages, wherein an "ID" attribute is "4" or "5", or information about subtitles of multiple languages, wherein the "ID" attribute is "6" or "7".

Since not only the audio data, but also the subtitle may be divided into a plurality of segments according to time, the audio data and the subtitle may be changed to audio data and a subtitle of another language during streaming.

Referring back to FIG. 5A, the client 130 requests the server 120 to transmit at least one of the plurality of media data, in operation 530. The client 130 selects at least one media data that is encoded to have a quality suitable for the streaming environment by referring to the information about the plurality of media data, and requests the server 120 for the selected at least one media data. The client 130 may transmit an HTTP request for requesting the server 120 to transmit a predetermined media data. The server 120 transmits the media data according to the request of the client 130. Alternatively, the server may transmit at least one segment generated by encoding content to have a predetermined quality and dividing the encoded content based on time, to the client 130. The server 120 may transmit the requested media data to the client 130 as an HTTP response to the HTTP request.

Figure 5B:
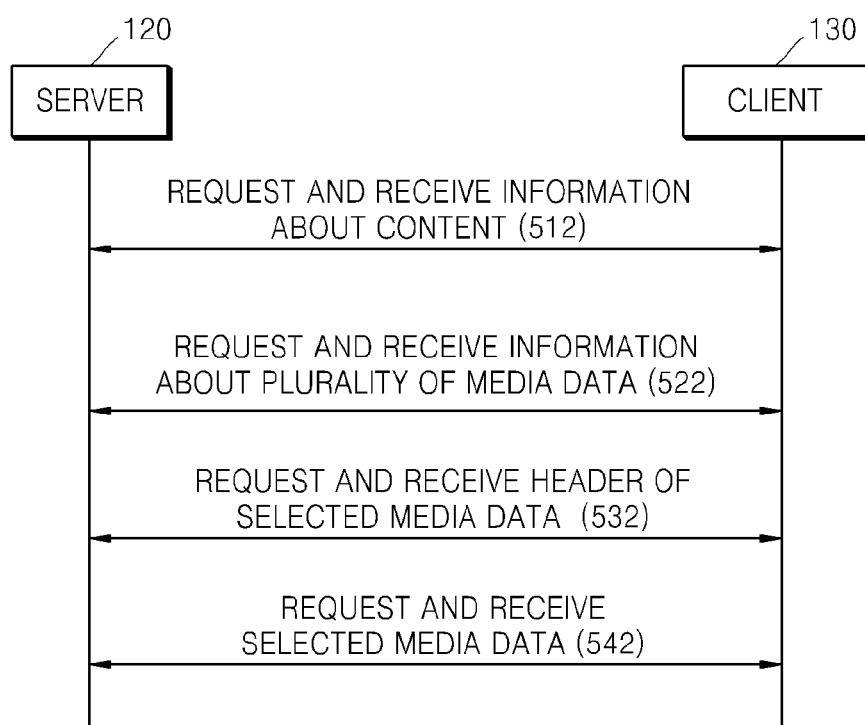

FIG. 5B is a flowchart for describing a streaming method according to another exemplary embodiment. Referring to FIG. 5B, in operation 512, the client 130 requests the server 120 to transmit information about predetermined content and receives the information about predetermined content from the server 120. The client 130 may transit an HTTP request for requesting the server 120 to transmit the information about predetermined content, and receive the information about predetermined content as an HTTP response to the HTTP request. The information about predetermined content may be included in an XML file.

In operation 522, the client 130 requests the server 120 to transmit information about a plurality of media data based on the information about predetermined content received in operation 512. The client 130 may request the server 120 for a media presentation description through the HTTP request, and receive the media presentation description as the HTTP response.

In operation 532, the client 130 requests a header of media data selected based on the information about a plurality of media data received in operation 522. At least one media data that is suitable to a streaming environment is selected from among the plurality of media data based on the information about the plurality of media data received in operation 522, and a header of the selected at least one media data is requested. The header of the selected at least one media data is requested by referring to the information about the plurality of media data received in operation 522. The server 120 transmits a file of the header of the selected at least one media data to the client 130 in response to the request of the client 130.

In operation 542, the client 130 requests the server 120 to transmit selected media data based on the information about the plurality of media data received in operation 522, and the header received in operation 532. The client 130 requests the server 120 to transmit at least one segment generated by encoding content to have a predetermined quality and dividing the encoded content based on time, and the server 120 transmits the requested at least one segment to the client 130.

Figure 10A:
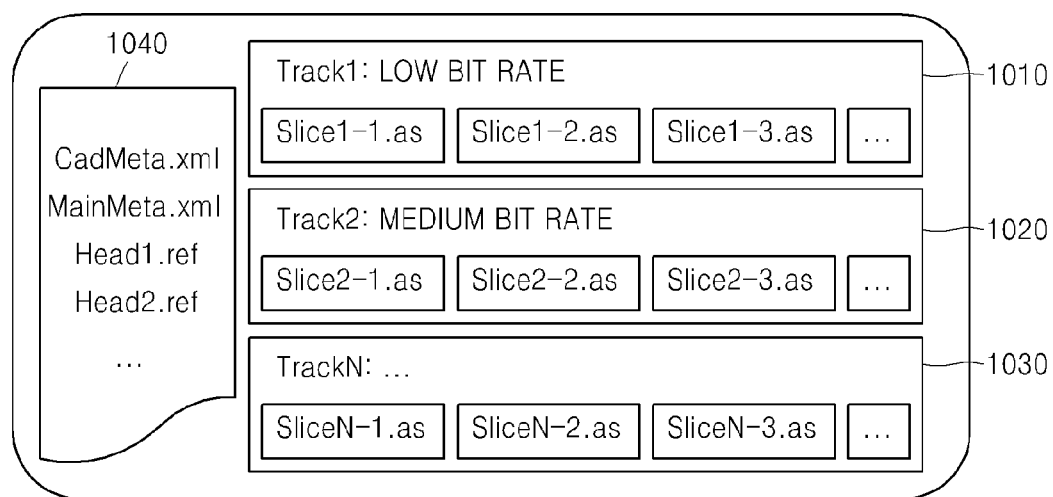
FIGS. 10A through 10C each illustrate a plurality of media data according to exemplary embodiments.
Figure 10B:
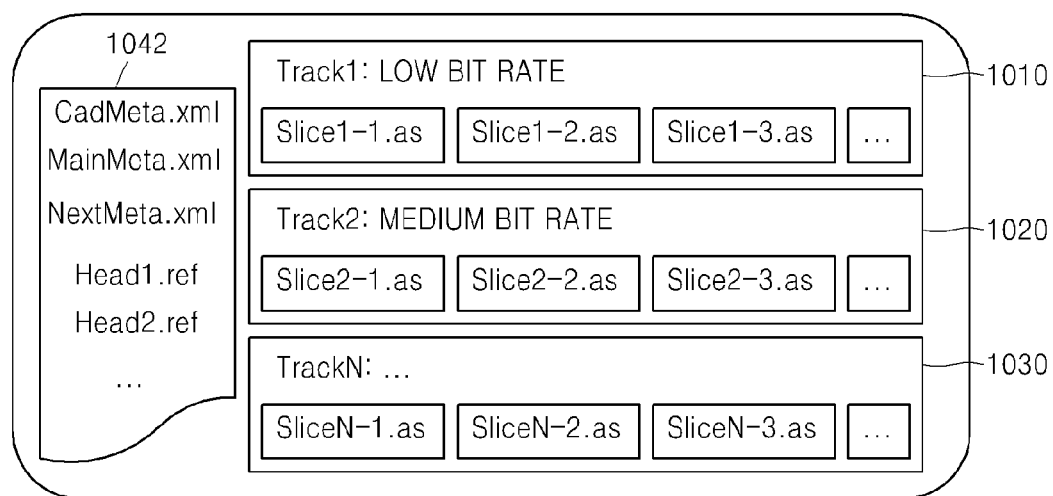
Figure 10C:
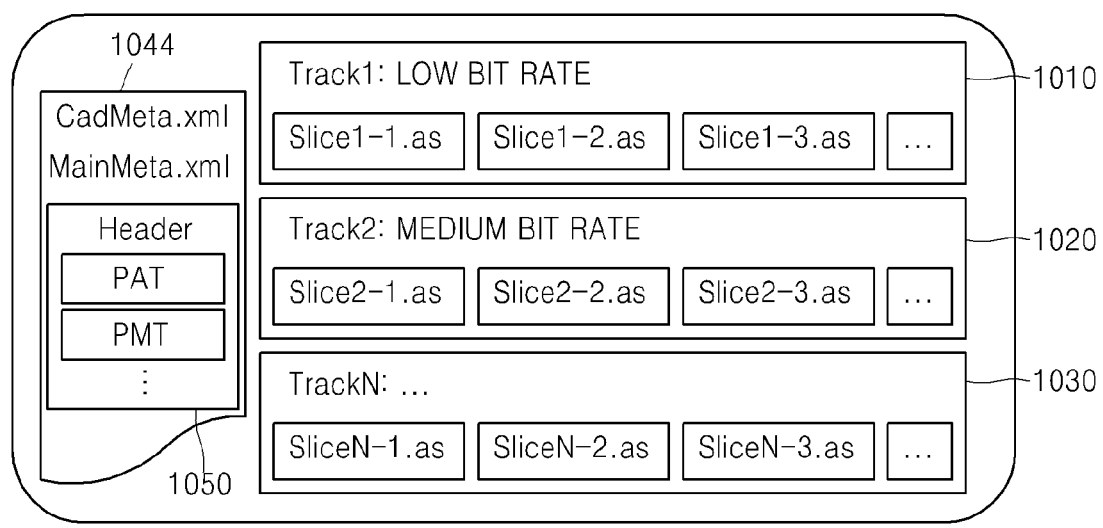

FIGS. 10A through 10C each illustrate a plurality of media data according to exemplary embodiments. FIGS. 10A through 10C each illustrate the plurality of media data included in the server 120 to perform one of the streaming methods illustrated in FIGS. 5A and 5B.

Referring to FIG. 10A, the server 120 may include a plurality of media data 1010, 1020, and 1030 generated by encoding one content to have a plurality of different qualities, for streaming that is adaptive to a streaming environment. "Track1" through "TrackN" denote the plurality of media data 1010 through 1030. Also, each of the plurality of media data 1010 through 1030 may include at least one segment generated by dividing each of the plurality of media data 1010 through 1030 based on time. "Slice1-1.as", "Slice1-2.as", "Slice1-3.as", "Slice2-1.as", "Slice2-2.as", "Slice2-3.as", "SliceN-1.as", "SliceN-2.as", and "SliceN-3.as" denote at least one segment.

The server 120 may include information 1040 required for the client 130 to access the plurality of media data 1010 through 1030. The server 120 may include a "CadMeta.xml" file as information about content, a "MainMeta.xml" file as information about the plurality of media data 1010 through 1030, and a "Head1.ref" file, a "Head2.ref" file, etc. as header files of the plurality of media data 1010 through 1030. Here, the "Head1.ref" file may be a header file of the "Track1", and the "Head2.ref" file may be a header file of the "Track2".

The "CadMeta.xml" file may be a CAD file according to the OIPF standard, and the "MainMeta.xml" file may be the media presentation description described above. Also, the "Head1.ref" and "Head2.ref" files are selective elements, and may not exist when headers are included in the plurality of media data 1010 through 1030.

Referring to FIG. 10B, information 1042 required for the client 130 to access the plurality of media data 1010, 1020, and 1030 may further include a "NextMeta.xml" file. As described above, the "NextMeta.xml" file may be a media presentation description of a following content to be reproduced after current content. As described above, the media presentation description of the current content, i.e., the "MainMeta.xml" file, includes the URL of the media presentation description of the following content, and thus the client 130 may access the "NextMeta.xml" file based on the "MainMeta.xml" file.

Referring to FIG. 10C, header files of the plurality of media data 1010, 1020, and 1030 may exist in one header file 1050. Instead of existing for each of the plurality of media data 1010 through 1030, the header files may exist as one header file 1050 and may be included in information 1044 required to access the plurality of media data 1010 through 1030.

For example, when each of the plurality of media data 1010 through 1030 corresponds to an elementary stream, for example, an elementary stream according to the MPEG-2 standard, the header files of the plurality of media data 1010 through 1030 may be the header file 1050 including a program association table (PAT) and a program map table (PMT). At least one of the PAT and the PMT is separated from the plurality of media data 1010 through 1030 to prepare the header file 1050, and the media presentation description may include information pointing to the header file 1050. The information pointing to the header file 1050 may be URL information of the header file 1050 or information for specifying a packet including the header file 1050 in an MPEG-2 TS. The header file 1050 including at least one of the PAT and the PMT is an initialization segment, and may be transmitted to the client 130 before segments including payload data, so as to initiate reproduction of the plurality of media data 1010 through 1030.

Referring back to operation 532 of FIG. 5B, the client 130 may obtain the information pointing to the header file 1050 by referring to the media presentation description, and may request the header file 1050 based on the information pointing the header file 1050. After requesting and receiving the header file 1050 based on the information pointing to the header file 1050, at least one of the plurality of media data 1010 through 1030 is selected based on at least one of the PAT and the PMT included in the header file 1050, and the selected at least one media data is requested from the server 120. The PAT and the PMT may be separated as the header file 1050 or included in the plurality of media data 1010 through 1030, but may include an entire list of elementary streams included in the plurality of media data 1010 through 1030 regardless of the locations of the PAT and the PMT.

According to the MPEG-2 standard, packet IDs (PIDs) defined in the PAT and the PMT are different according to elementary streams. Accordingly, PIDs assigned to each of the plurality of media data 1010 through 1030 may be different. Alternatively, according to another exemplary embodiment, since the plurality of media data 1010 through 1030 generated by encoding one content to have different qualities are elementary streams of the same content, the same PID may be set.

When the plurality of media data 1010 through 1030 correspond to a plurality of elementary streams according to the MPEG-2 standard, each of segments included in the plurality of media data 1010 through 1030 may include at least one continuous packetized elementary stream (PES). However, one PES is included in one segment. In other words, one PES is not included in two different segments.

Since a plurality of media data are generated by encoding one content to have different qualities, presentation time stamps (PTSs) and/or decoding time stamps (DTSs) included in PESs of the plurality of media data may be aligned according to reproduction times. In other words, if an initial PES of first media data and an initial PES of second media data are content reproduced at the same time, a PTS and/or a DTS may be equally set.

Further, when the second media data is reproduced while reproducing the first media data by changing media data according to the streaming environment, the PTSs and/or the DTSs may be continuously aligned so that the first and second media data are continuously reproduced. In other words, when the second media data is reproduced while reproducing the first media data by changing media data, the PTS and/or the DTS of the last PES before the changing and the PTS and/or the DTS of the first PES after the changing may be continuously set.

The PTS and/or the DTS define a time stamp of video data. Accordingly, time stamps of the plurality of media data with respect to video data are aligned according to the reproduction times of the plurality of media data as described above. Such alignment of the time stamps based on the reproduction times may be equally applied to audio data. In other words, like the time stamps of the plurality of media data with respect to the video data, time stamps of the pieces of media data with respect to the audio data may also be aligned according to the reproduction times for adaptive streaming.

Figure 11A:
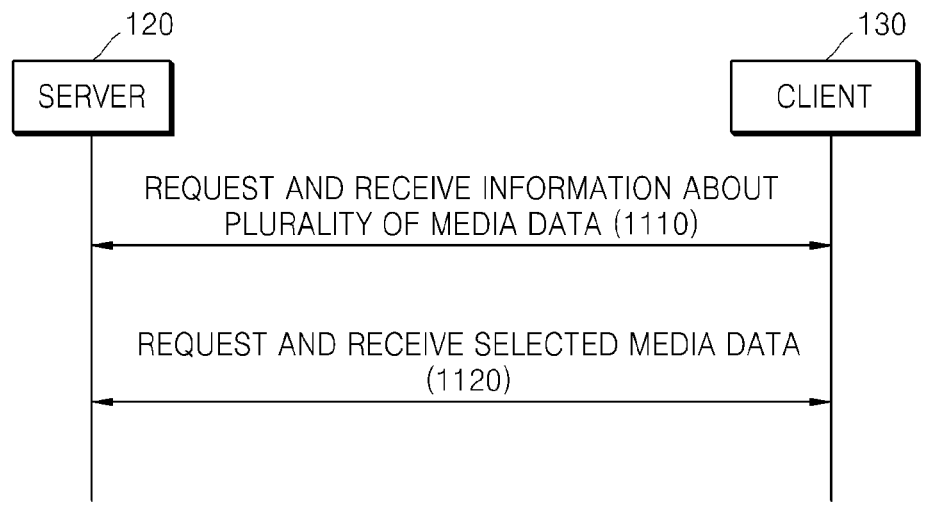
FIGS. 11A and 11B are flowcharts for describing streaming methods according to other exemplary embodiments.

FIG. 11A is a flowchart for describing a streaming method according to another exemplary embodiment. Referring to FIG. 11A, the client 130 requests information about a plurality of media data to the server 120, in operation 1110. The client 130 may request a media presentation description to the server 120 via an HTTP request, and may receive the media presentation description as an HTTP response. The client 130 requests the server 120 for and receives the information about the plurality of media data generated by encoding one content to have a plurality of different qualities, so as to perform streaming that is adaptive to a streaming environment. The streaming method of FIG. 11A is different from the streaming method of FIG. 5A as the information about the plurality of media data is requested and received without requesting and receiving information about content.

In operation 1120, the client 130 requests the server 120 to transmit at least one of the plurality of media data. The client 130 selects and requests at least one media data that is encoded to have a quality suitable for the streaming environment by referring to the information about the plurality of media data, and receives the requested at least one media data from the server 120.

Figure 11B:
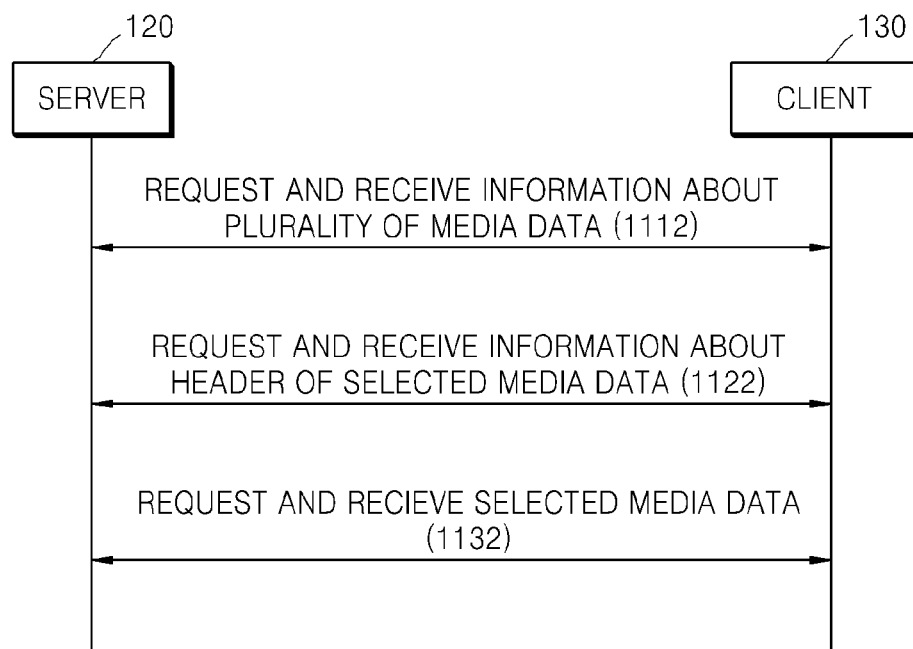

FIG. 11B is a flowchart for describing a streaming method according to another exemplary embodiment. Referring to FIG. 11B, the client 130 requests the server 120 to transmit information about a plurality of media data and receives the information about the plurality of media data from the server 120 in response to the request, in operation 1112. The client 130 may request the server 120 for a media presentation description through an HTTP request, and receive the media presentation description as an HTTP response.

In operation 1122, the client 130 requests a header of selected media data based on the information about the plurality of media data received in operation 1112. The client 130 requests the header of media data selected according to a streaming environment by referring to the information about the plurality of media data received in operation 1112. In response to the request, the server 120 transmits a file including the header of the selected media data to the client 130.

In operation 1132, the client 130 requests the server 120 to transmit the media data selected based on the information about the plurality of media data received in operation 1112, and the header received in operation 1122. The client 130 requests the server 120 to transmit at least one segment generated by encoding content in a predetermined quality and dividing the encoded content based on time, and the server 120 transmits the requested at least one segment to the client 130.

Figure 12A:
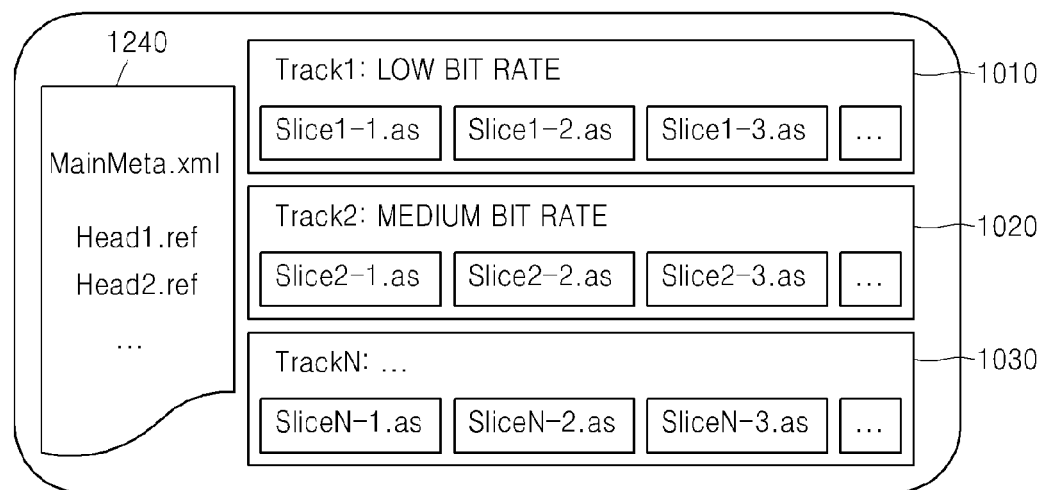
FIGS. 12A and 12C each illustrate a plurality of media data according to other exemplary embodiments.
Figure 12B:
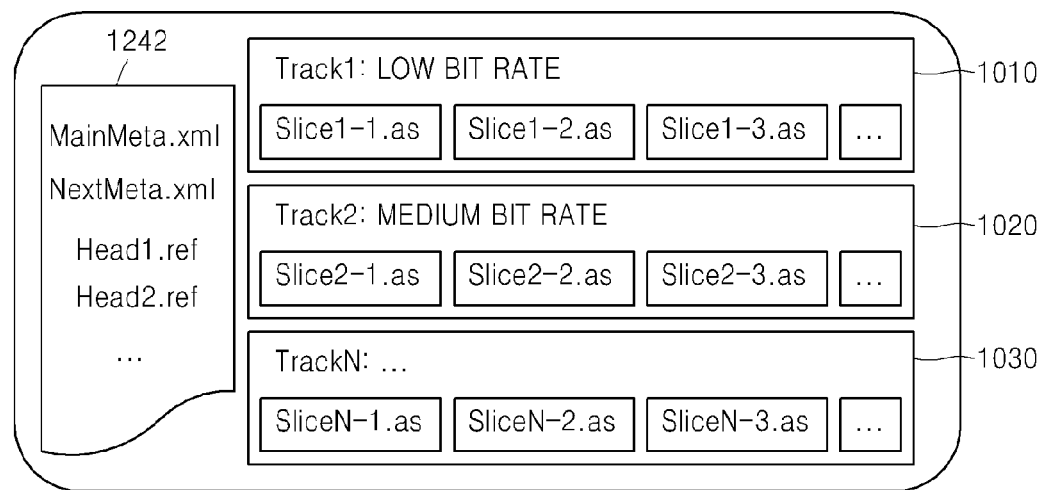

FIGS. 12A and 12B each illustrate a plurality of media data according to other exemplary embodiments. FIGS. 12A and 12B each illustrate the plurality of media data included in the server 120, which are used to perform one of the streaming methods of FIGS. 11A and 11B.

Referring to FIG. 12A, the server 120 may include the plurality of media data 1010, 1020, and 1030 generated by encoding one content to have a plurality of different qualities for streaming that is adaptive to a streaming environment, as shown in FIG. 10A.

Here, the plurality of media data 1010 through 1030 of FIG. 12A is different from the plurality of media data 1010 through 1030 of FIG. 10A in information 1240 required for the client 130 to access the plurality of media data 1010 through 1030. The server 120 only includes information about the plurality of media data 1010 through 1030 and not information about content, unlike the exemplary embodiment of FIG. 10A. Here, the client 130 may receive the information about content from another entity instead of the server 120, and access the plurality of media data 1010 through 1030 included in the server 120 based on the received information about content.

Referring to FIG. 12B, information 1242 required for the client 130 to access the plurality of media data 1010, 1020, and 1030 may be prepared by further including a "Next-Meta.xml" file to the information 1240 of FIG. 12A.

Figure 12C:
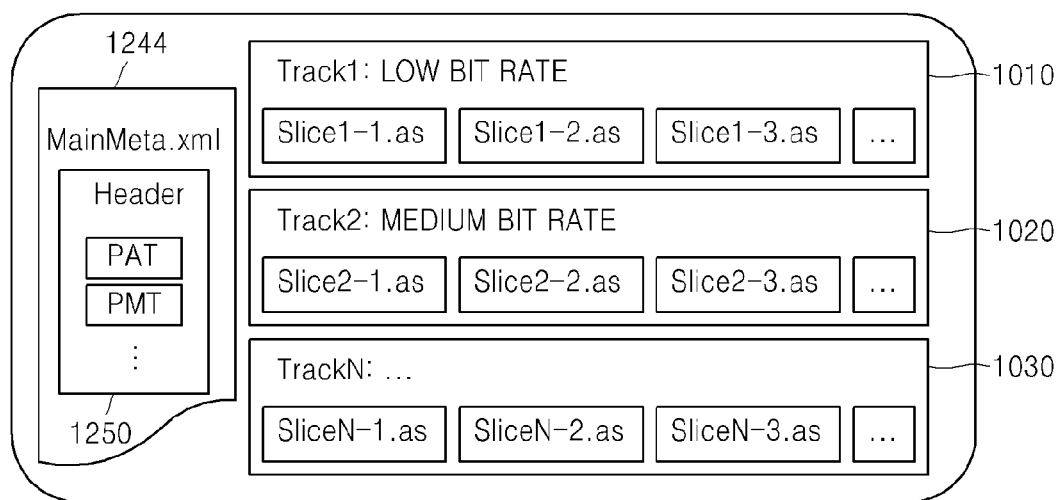

Referring to FIG. 12C, the header files of the plurality of media data 1010 through 1030 may exist in one header file 1250. The header files do not exist for each of the plurality of media data 1010 through 1030, but may be included in information 1244 required to access the plurality of media data 1010 through 1030, as one header file 1250. The header file 1250 corresponds to the header file 1050 of FIG. 10C.

Figure 13:
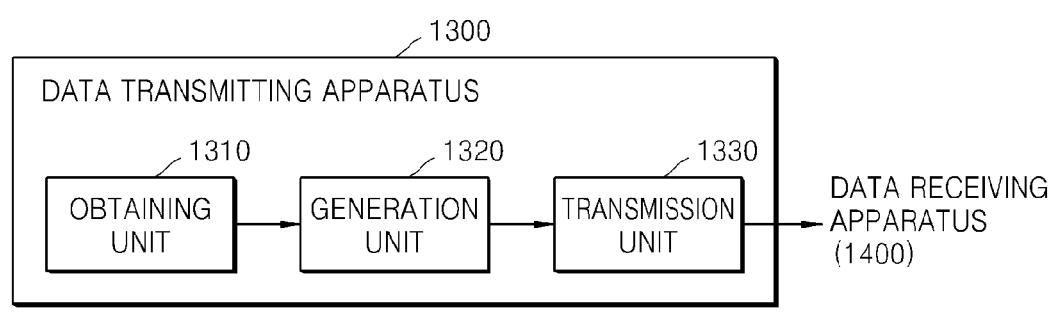
FIG. 13 is a block diagram of a data transmitting apparatus according to an exemplary embodiment.

FIG. 13 is a block diagram of a data transmitting apparatus 1300 according to an exemplary embodiment. The data transmitting apparatus 1300 includes an obtaining unit 1310, a generation unit 1320, and a transmission unit 1330.

The obtaining unit 1310 obtains a plurality of media data generated by encoding the same content to have different qualities. The plurality of media data may be generated by encoding content according to different methods or may be generated by encoding content according to the same method by changing an encoding parameter. In this case, the plurality of media data have different features. For example, the plurality of media data may be different from each other in terms of a bit rate, resolution, or codec.

Since the plurality of media data are generated from the same content, there may be a switch between one media data and another media data from among the plurality of media data. When a communication environment deteriorates during use of high-resolution media data, a user may switch from the high-resolution media data to low-resolution media data generated from the same content. Switching from one media to another media data may be performed in units of segments.

The segments are generated by dividing encoded content based on time. Thus, one media data may include one or more segments. If a user wants to reproduce second media data, the quality of which is different from that of first media content during use of an Ath segment of the first media data, the user may receive and use a segment of the second media data, which corresponds to the Ath segment of the first media data.

The generation unit 1320 generates location information indicating a randomly accessible point of each of at least one segment of the segments. The generation unit 1320 may generate only one location information and include random access point information regarding all of the segments into the generated location information, or may generate a plurality of location information corresponding to the segments, respectively. In the latter case, each of the plurality of location information specifies a location of only random access points in the corresponding segment.

Figure 32A:
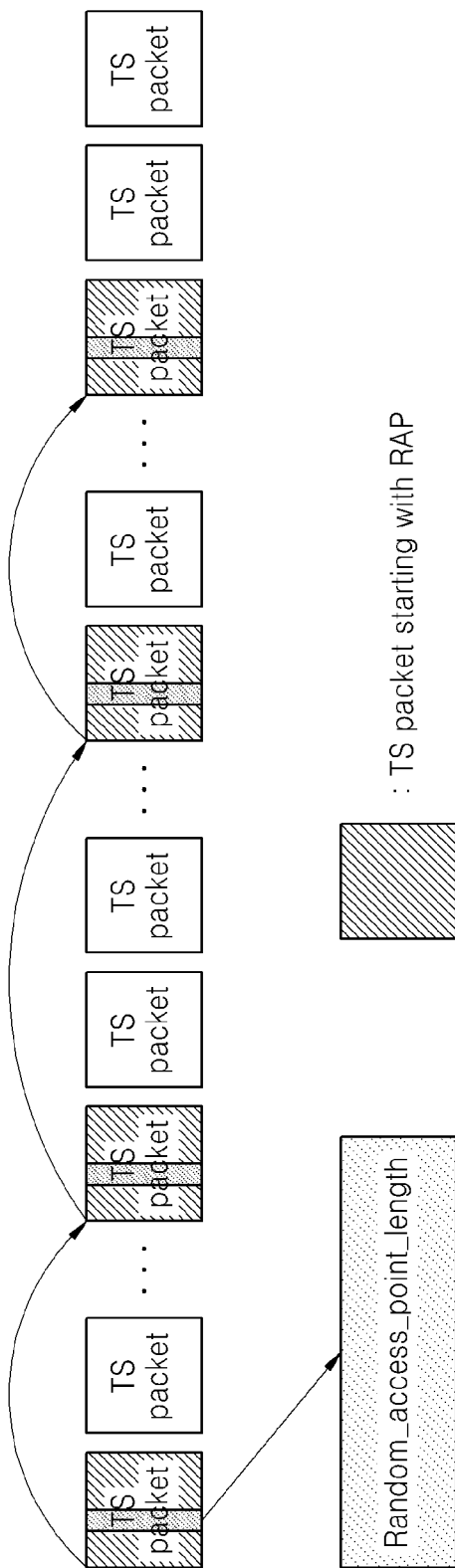
FIGS. 32A and 32B illustrate methods of providing random accessing according to a value of a 'random_access_point_count' field, according to exemplary embodiments.
Figure 32B:
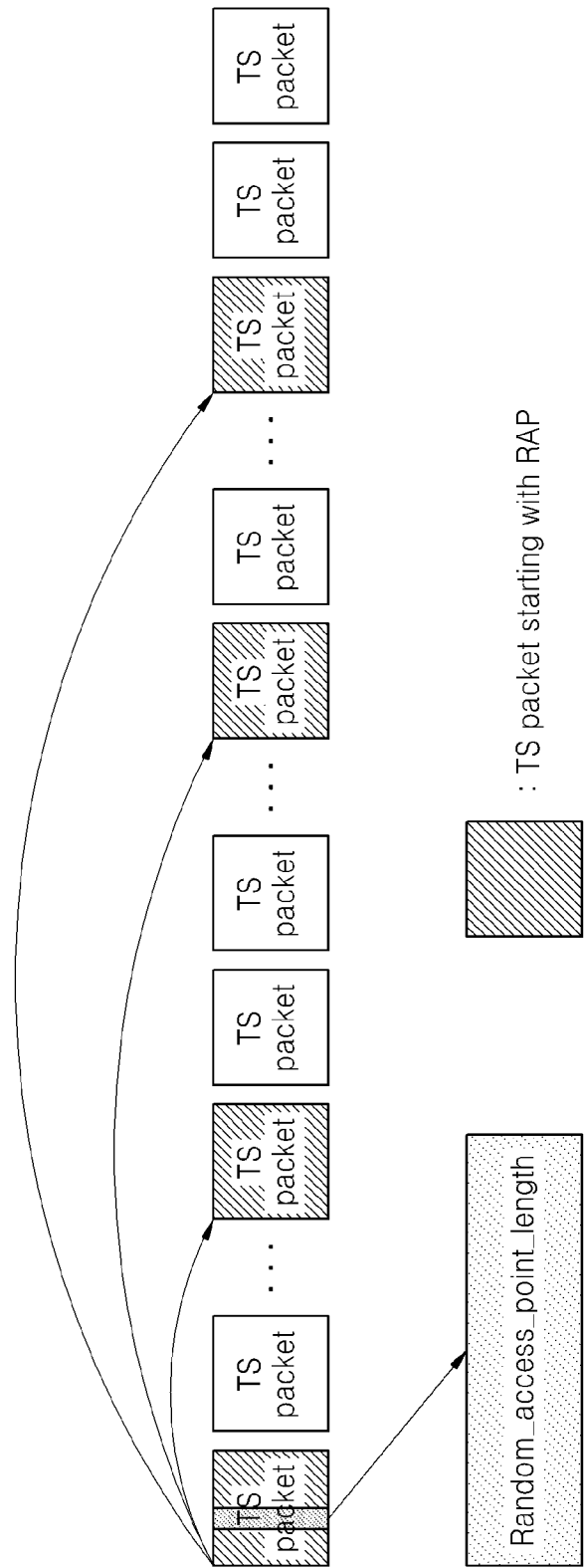
Figure 32C:
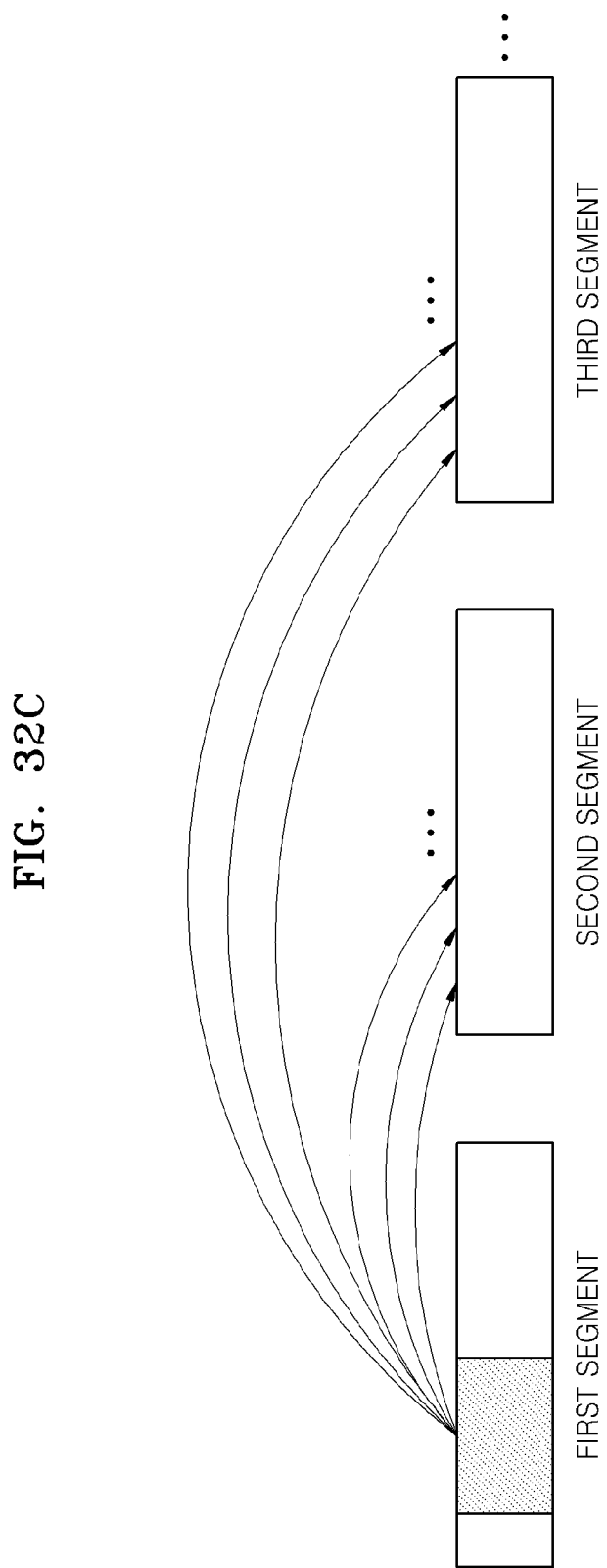
FIG. 32C illustrates method of providing random accessing using at least one segment which includes location information at least one other segments according to an exemplary embodiment.

In another exemplary embodiment, the generation unit 1320 generates at least one segment which includes location information on at least one other segment which will be described in detail with reference to FIG. 32C.

Each of the segments may consist of at least one data unit. The generation unit 1320 may insert the location information into a predetermined location in the at least one data unit.

The location information may be transmitted according to one of various ways according to exemplary embodiments. Five ways of transmitting location information according to exemplary embodiments are as follows but the exemplary embodiments are not limited thereto.

i) In the case of media data encoded according to the MPEG 2 standard, location information according to an exemplary embodiment may be transmitted by inserting the location information into a 'private_data_bytes' field included in an 'adaptation field' of a transport packet. The 'private_data_bytes' field provides additional frame information at a transport stream (TS) level, which will be described in detail with reference to FIG. 26A later.

ii) The location information may be transmitted by inserting the location information into an 'adaptation_field_extension' field included in the 'adaptation field' of the transport packet. The 'adaptation_field_extension' field includes a 'reserved' region that a user may newly define and use, and the location information may be transmitted via the 'reserved' region, which will be described in detail with reference to FIG. 26B later.

iii) The location information may be transmitted via a predetermined field in each of conventional sections. For example, the MPEG-2 standard defines a 'TS_description_section' that provides various descriptions by using a 'descriptor' field. The location information may be transmitted by using one of the various descriptions, which will be described in detail with reference to FIGS. 26C and 26D later.

iv) A new section may be defined, and the location information may be transmitted by using the new section. A section is one of various data formats which may be transmitted in a transport stream, and is generally data containing information related to a service, e.g., service information and program guide information, which will be described in detail with reference to FIGS. 26E and 26F later.

v) In the case of media data encoded according to the MPEG 4 standard, the location information is inserted into a 'Moof' box or a 'Moov' box.

Hereinafter, for convenience of explanation, exemplary embodiments will be described with respect to a packet, but it would be obvious to those of ordinary skill that the exemplary embodiments may be applied to encoding according to various other standards, for example, a box according to the MPEG 4 standard.

A structure of the location information may vary according to a method of indicating a randomly accessible point in a corresponding segment. In an exemplary embodiment, three types of location information will now be described but the location information according to an exemplary embodiment is not limited thereto.

From among the three types of location information, a first type of location information includes first offset information indicating a location of a subsequent packet that is randomly accessible in a corresponding segment. The first type of location information may be included in a predetermined location that is randomly accessible in each packet. The first type of location information will be described in detail with reference to FIGS. 15A, 15B, and 20 later.

A second type of location information includes second offset information indicating locations of all packets that are randomly accessible in the corresponding segment. The second type of location information may be completely included in one packet or may be divided into parts and the parts may be included in a plurality of consecutive packets, respectively. For example, the second type of location information may be divided into parts and the parts may be included in a plurality of consecutive packets at the start of the corresponding segment. The second type of location information will be described in detail with reference to FIGS. 17A, 17B, and 24 later.

A third type of location information includes third offset information indicting location information regarding all of the access units in the corresponding segment. Since the third type of location information includes the location information regarding all of the access units, a location of even an access unit that cannot be randomly accessed may be easily detected. The third type of location information will be described in detail with reference to FIGS. 19 and 25 later.

When different types of location information are used as described above, the type of location information needs to be signaled. To this end, the generation unit 1320 may include information regarding the type of the location information into the location information.

The transmission unit 1330 transmits the location information. As described above, the location information may be inserted into a predetermined packet in the corresponding segment, and the transmission unit 1330 may transmit media data containing a segment into which the location information is inserted.

Figure 14:
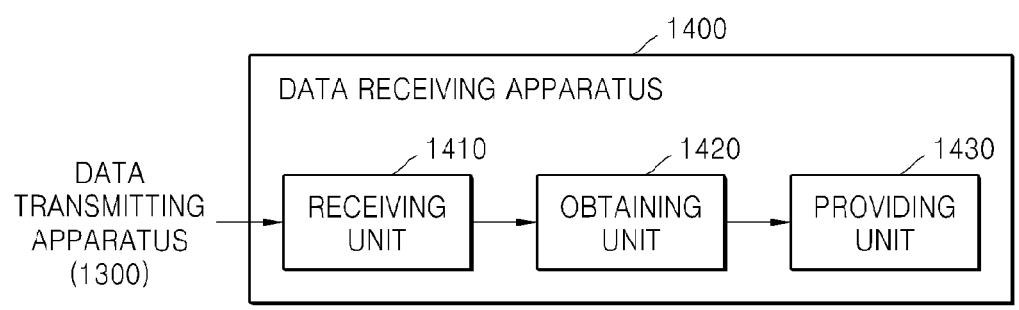
FIG. 14 is a block diagram of a data receiving apparatus according to an exemplary embodiment.

FIG. 14 is a block diagram of a data receiving apparatus 1400 according to an exemplary embodiment. Referring to FIG. 14, the data receiving apparatus 1400 includes a receiving unit 1410, an obtaining unit 1420, and a providing unit 1430.

The receiving unit 1410 receives at least one of a plurality of media data generated by encoding the same content to have different qualities. The plurality of media data include at least one segment that is a part obtained by dividing the encoded content based on time.

The receiving unit 1410 may first receive a file containing information regarding a plurality of media data generated by encoding the same content to have different qualities, and may selectively receive at least one of the plurality of media data, which is selected by a user or is selected based on an ambient environment.

The obtaining unit 1420 obtains location information indicating a randomly accessible point in each of the at least one segment. The location information may include information regarding a random access point in only a segment into which the location information is inserted, or may include information regarding random access points in all of segments that includes the segment into which the location information is inserted. For convenience of explanation, it is assumed that the location information includes the information regarding the random access point in only the segment into which the location information is inserted.

The segment may consist of at least one packet, e.g., an MPEG 2 TS packet or an MPEG 4 box. The obtaining unit 1420 obtains the location information by accessing a predetermined packet in the segment.

A method of obtaining the location information by the obtaining unit 1420 may vary according to the type of the location information. Thus, first, the obtaining unit 1420 obtains information regarding the type of the location information.

In the case of the first type of location information, the obtaining unit 1420 accesses a particular packet, e.g., a first packet, in the segment. The obtaining unit 1420 obtains a location of a subsequent packet that is randomly accessible, based on a predetermined location in the accessed packet, e.g., a 'private_data_bytes' field. The obtaining unit 1420 may sequentially access packets that are randomly accessible so as to obtain the location of a subsequent random access point.

In the case of the second type of location information, the obtaining unit 1420 obtains location information of at least one predetermined packet in the segment. In one exemplary embodiment, the second type of location information may be divided into parts and the parts may be included in a plurality of consecutive packets, respectively. In this case, the obtaining unit 1420 obtains and combines the location information from the plurality of consecutive packets. If the second type of location information is completely obtained, then the location information does not need to be obtained again from the segment. It t may be inserted into a particular packet after the location information is updated, or may be inserted in a packet in a predetermined cycle of time since the location information may be updated or an error may occur in the location information.

In the case of the third type of location information, the obtaining unit 1420 obtains location information of at least one predetermined packet in the segment. In one exemplary embodiment, the third type of location information may be divided into parts and the parts may be included in a plurality of consecutive packets, respectively. In this case, the obtaining unit 1420 obtains and combines the location information from the plurality of consecutive packets. Since the third type of location information contains third offset information indicating location information of all of the access units in the segment, e.g., a P-frame, a B-frame, and an I-frame, an access unit that is not randomly accessible may be selectively accessed if necessary.

The providing unit 1430 provides random accessing for received media data, based on the location information.

Conventionally, random accessing is supported by using a 'random_access_indicator' field. Thus, a client should search for all of the packets one by one until a desired random access point is detected. However, according to an exemplary embodiment, random accessing may be effectively provided by providing random access information via a particular field, e.g., a 'private_data_bytes' field included in a header of an MPEG 2 TS packet.

FIG. 15A is a table illustrating a first type of location information 1510 according to an exemplary embodiment. Referring to FIG. 15A, a 'data_field_tag' field 1511 represents the type of the first type of the location information 1510. In the exemplary embodiment, it is assumed that location information corresponds to the first offset information indicating a subsequent random access point, the second offset information indicating all of random access points, or the third offset information indicating locations of all of access units.

A 'data_field_length' field 1512 represents field length.

An 'offset' field 1513 is a 16-bit field, and represents the total number of packets present between a current packet and a subsequent packet that is randomly accessible. Referring to FIG. 15A, although the total number of packets is defined in the 'offset' field 1513, any other value, e.g., a total of bytes, a PTS, a DTS, global time of media, or a frame number, may be defined as long as it may represent a subsequent random access point. Global time may represent a position of a subsequent packet that is randomly accessible using hour, minute and seconds.

FIG. 15B is a table illustrating a first type of location information 1520 according to another exemplary embodiment. Referring to FIG. 15B, a 'data_field_tag' field 1521 represents the first type of location information 1520.

A 'data_field_length' field 1522 represents field length.

A 'PTS' field 1523 represents a PTS of a frame provided by a packet indicated by a 'TS_index' field 1524. In one exemplary embodiment, the 'PTS' field 1523 may represent a global time of media.

The 'TS_index' field 1524 represents the total number of packets present between a current packet and a subsequent packet that is randomly accessed.

Figure 16:
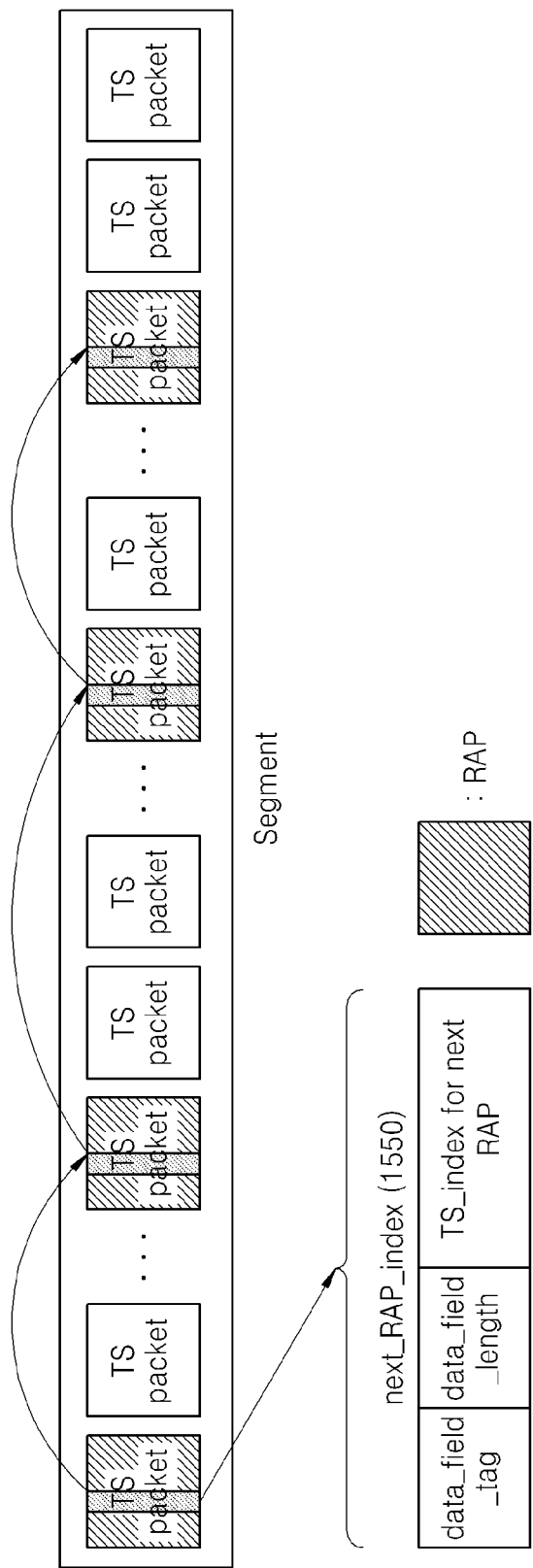
FIG. 16 is a diagram illustrating random accessing performed using the first type of location information of FIG. 15A and the first type of location information of FIG. 15B, according to an exemplary embodiment.

FIG. 16 is a diagram illustrating random accessing performed using the first type of location information 1510 of FIG. 15A and the first type of location information 1520 of FIG. 15B, according to an exemplary embodiment. FIG. 16 illustrates a plurality of packets in one segment In FIG. 16, it is assumed that the first type of location information 1510 and 1520 is included in only packets that are randomly accessible, and that a first packet in the segment is randomly accessible.

The obtaining unit 1420 of FIG. 14 access a 'Private_data_bytes' field included in the first packet. The obtaining unit 1420 of FIG. 14 obtains a next_RAP_index 1550 as a location information from the a 'Private_data_bytes' field included in the first packet. The location information obtained from the first packet includes offset information regarding a subsequent random access point.

It is assumed that while content is provided to a user by sequentially processing a plurality of packets starting from the first packet, the user requests to jump to a particular location. Since after the jumping, data reproduction should begin starting from a random access point, a location of a subsequent random access point is detected from the obtained location information and then a packet corresponding to the random access point is accessed. Then, data is reproduced by sequentially providing the packets starting from the accessed packet.

FIG. 17A is a table illustrating a second type of location information 1710 according to an exemplary embodiment. The second type of location information 1710 indicates all of the random access points in one segment.

The second type of location information 1710 may be inserted into one packet but in some cases, may be divided and inserted into a particular field of each of a plurality of consecutive packets. If the second type of location information 1710 completely occupies a space of one packet, in which data may be inserted, then the packet may not include payload data. In the packet, data included in a payload is identified using a PID. Thus, whether the packet includes the location information may be determined by using the PID.

A 'data_field_tag' field 1711 represents that the location information 1710 is a second type of location information.

A 'data_field_length' field 1712 represents field length.

A 'RAP_index_finish_flag' field 1713 indicates whether 'RAP_index' (i.e., second type of location information) data ends in a current packet. As described above, the second type of location information 1710 may be divided and present in a plurality of packets. When the 'RAP_index_finish_flag' field 1713 has a value of 0, a subsequent packet may include the second type of location information 1710. When the 'RAP_index_finish_flag' field 1713 has a value of 1, a subsequent packet may not include the second type of location information 1710.

A 'PTS' field' 1714 represents either a PTS of a frame starting from a packet indicated by a 'TS_index' field 1715 which will later be described, or a global time of media. The 'TS_index' field 1715 represents an index of each random access point. The 'TS_index' field 1715 may represent the location of each random access point by using the total number of packets or the total of bytes. In FIG. 17A, the total number of random access points in the segment is 'n+1'. Thus, in the second type of location information 1710, the 'PTS' field' 1714 and the 'TS_index' field 1715 are repeatedly present 'n+1' times.

FIG. 17B is a table illustrating a second type of location information 1720 according to another exemplary embodiment. The second type of location information 1720 indicates all of the random access points in one segment.

A 'data_field_tag' field 1721 represents the type of the second type of location information 1720.

A 'data_field_length' field 1722 represents field length.

An 'RAP_count' field 1723 represents the total number of the random access points in the segment.

A 'PTS' field' 1724 represents either a PTS of a frame starting from a packet indicated by a 'TS_index' field 1725, which will be described later, or a global time of media. A 'TS_index' field 1725 represents the total number of packets present between a current packet and a subsequent packet that is randomly accessible.

FIG. 17C illustrates location information according to another exemplary embodiment. Particularly, FIG. 17C illustrates an index of segments that constitute media data, according to an exemplary embodiment. Referring to FIG. 17C, location information according to an exemplary embodiment is inserted into a segment_index( ) and the segment_index( ) is transmitted via a 'private_data_field'. In FIG. 17C, a description of fields that are not related to the location information according to an exemplary embodiment will be omitted.

A 'segment_contains_rap' field 1731 indicates whether at least one random access point is present in the segment.

A 'segment_starts_with_rap' field 1732 indicates whether an access point closest to the segment is a random access point. That is, the 'segment_starts_with_rap' field 1732 indicates whether the segment starts with a random access point. A 'number_entries' field 1733 represents the total number of random access points.

A 'direction' field 1734 represents a direction in which a random access point is present with respect to a current location. For example, the 'direction' field 1734 may represent whether a random access point is a previous random access point or a subsequent random access point.

A 'reference type' field 1735 defines the type of a reference packet when a random access point is indexed. Table 1 shows an example of a reference packet according to the 'reference type' field 1735.

TABLE 1

| value | Description |
| --- | --- |
| 00 | TS packet including segment index |
| 01 | Reserved |
| 10 | Access point that may be referred to with respect to preceding access unit |
| 11 | Random access point |

An 'offset flags' field 1736 represents the type of an offset value. Table 2 shows an example of the type of an offset value according to the value of the 'offset flags' field 1736.

TABLE 2

| value | Description |
| --- | --- |
| 00 | 8 bit |
| 01 | 16 bits |
| 10 | 32 bits |
| 11 | 64 bits |

If the 'offset flags' field 1736 has a value of 00 and a field representing an offset value has a value of 3, then the offset value may be 8×3(=24) bits.

A 'rap_size_present flag' field 1737 indicates whether information representing the location of a random access is present in a segment entry.

A 'rap_size' field 1738 represents the total number of consecutive TS packets to be read so as to completely decode a random access unit. That is, the 'rap_size' field 1738 represents the total number of packets present between a current packet and a subsequent random access point. In this case, the total number of packets defined in the 'rap_size' field 1738 includes all of the packets having different PIDs, which are present between a first packet and a last packet of an access unit.

Figure 18:
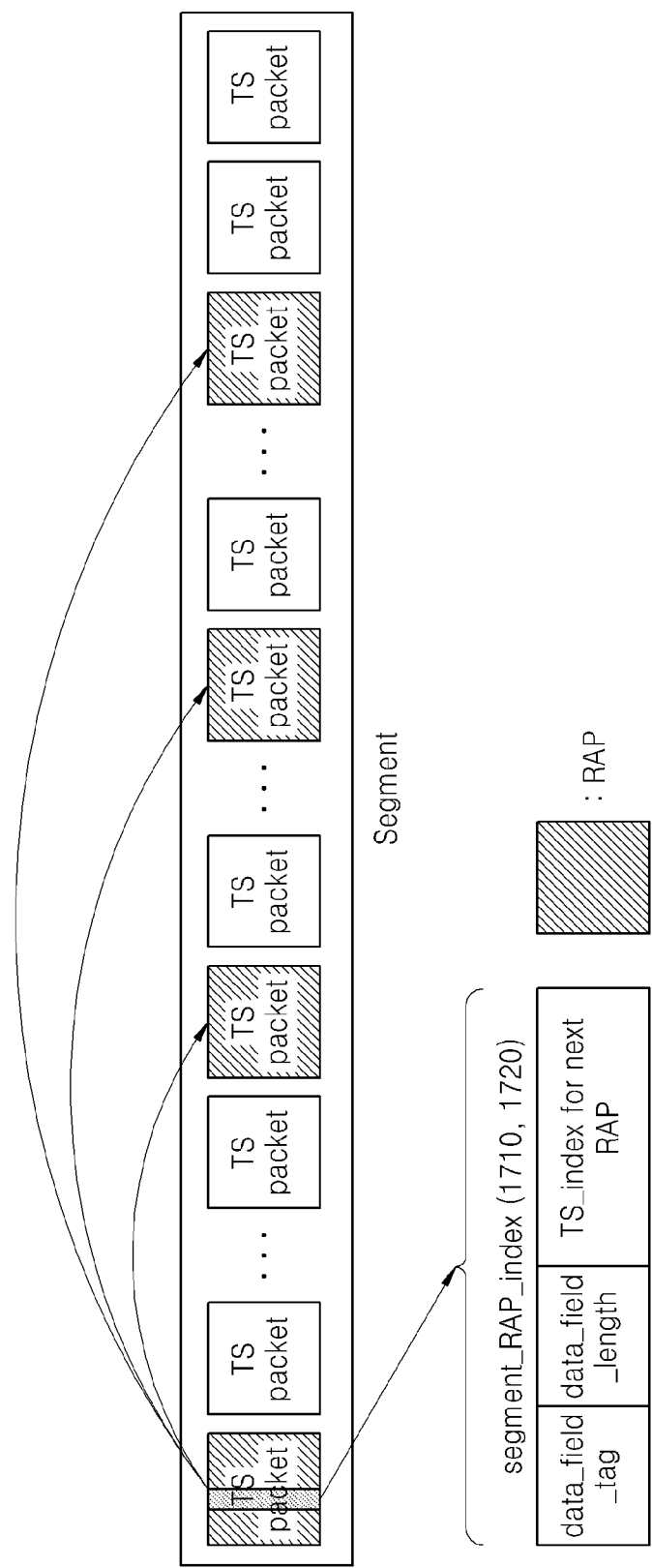
FIG. 18 is a diagram illustrating random accessing performed using the second type of location information of FIG. 17A and the second type of location information of FIG. 17B, according to another exemplary embodiment.

FIG. 18 is a diagram illustrating random accessing performed using the second type of location information 1710 of FIG. 17A and the second type of location information 1720 of FIG. 17B, according to another exemplary embodiment. The obtaining unit 1420 of FIG. 14 obtains the second type of location information 1710 and the second type of location information 1720 by accessing a 'Private_data_bytes' field included in a first packet or at least one consecutive packet. The second type of location information 1710 and the second type of location information 1720 obtained from the first packet include offset information regarding all of the random access points in a segment.

It is assumed that while content is provided to a user by sequentially processing a plurality of packets starting from the first packet, the user requests to jump to a particular location. Since the second type of location information 1710 and the second type of location information 1720 include location information of all of the access points in the segment, a random access point present after the particular location is accessed, and data is reproduced by sequentially provides the packets starting from the accessed packet.

FIG. 19 is a table illustrating third type of location information 1910 according to an exemplary embodiment. A 'data_field_tag' field 1911 represents the type of the third type of location information 1910.

A 'data_field_length' field 1912 represents field length.

An 'AU_index_finish_flag' field 1913 indicates whether 'AU_index' data ends in a current packet. As described above, the third type of location information 1910 may be divided and included in a plurality of consecutive packets. If the 'AU_index_finish_flag' field 1913 has a value of 0, a subsequent packet may include the third type of location information 1910. If the 'AU_index_finish_flag' field 1913 has a value of 1, the subsequent packet may not include the third type of location information 1910.

A 'TS_index' field 1914 represents location of a packet for each access unit. According to another exemplary embodiment, the 'TS_index' field 1914 may represent a location of an 'AU_information' field for each access unit.

An 'AU_coding_type_information' field 1915 represents the type of each access unit. For example, the 'AU_coding_type_information' field 1915 may represent that each access unit is a B-frame, a P-frame, an I-frame, or an IDR frame.

FIG. 20 is a table illustrating a first type of location information 2010 according to another exemplary embodiment. The location information 2010 of FIG. 20 is the same as the location information 1510 of FIG. 15A except for some of the fields, and differences in the fields will now be described.

A 'dependency_flag' (or 'weighting_flag') field 2011 indicates whether a 'dependency' field 2013 is present. If the 'dependency_flag' (or 'weighting_flag') field 2011 is set to '1', a packet indicated by a corresponding random access point has a dependency upon another packet. That is, the packet may be processed and reproduced together with data of at least another packet.

A 'viewing_flag' field 2012 indicates whether a 'viewing' field 2014 is present. If the 'viewing_flag' field 2012 is set to '1', the corresponding random access point may provide a three-dimensional (3D) image.

The 'dependency' field 2013 represents dependency of a packet corresponding to a random access point. For example, it is assumed that there is a scalable image component consisting of a base layer and an enhancement layer. Since the base layer may be decoded without the enhancement layer, the dependency of the base layer is set to '0'. However, the base layer and lower layers should be decoded to decode the enhancement layer. That is, the higher a layer goes, the more the layer's dependency is increasing. Therefore, the dependency of the enhancement layer is set to '1' or more. A term 'weighting' is a similar to the term 'dependency' but is used in an opposite manner to the way the term 'dependency' is used. For example, it is assumed that there is a scalable image component consisting of a base layer and an enhancement layer. Since the base layer may be decoded without the enhancement layer, the base layer is more important than the enhancement layer. Therefore, a weighting value of the base layer is larger than the enhancement layer's.

The 'viewing' field 2014 represents a viewpoint level of an image encoded using multi-view coding, e.g., a free-viewpoint television (TV) image, a multi-viewpoint 3D TV image, or a stereoscopic (two-viewpoint) image. In the case of the stereoscopic image, the 'viewing' field 2014 corresponding to a packet providing a left-viewpoint image may be set to '0' and the 'viewing' field 2014 corresponding to a packet providing a right-viewpoint image may be set to '1'.

FIG. 21 illustrates scalable image data according to an exemplary embodiment. Referring to FIG. 21, (n+1) image data are provided. Image data corresponding to a base layer is low-resolution image data that may be reproduced alone. If a user requires image data, the resolution or sound quality of which is higher than the low-resolution image data by one level, image data corresponding to an enhancement layer 1 and the image data corresponding to the base layer are processed and reproduced. However, the image data corresponding to the enhancement layer 1 cannot be reproduced alone. Similarly, if the user requires highest-resolution image data, all of the image data corresponding to the base layer to image data in an enhancement layer n are processed and reproduced.

The higher the layer of image data, the more image data should be reproduced together with the other image data. In this case, the dependency of the image data increases but the importance thereof decreases. Thus, a weight assigned to the image data is lower.

Figure 22:
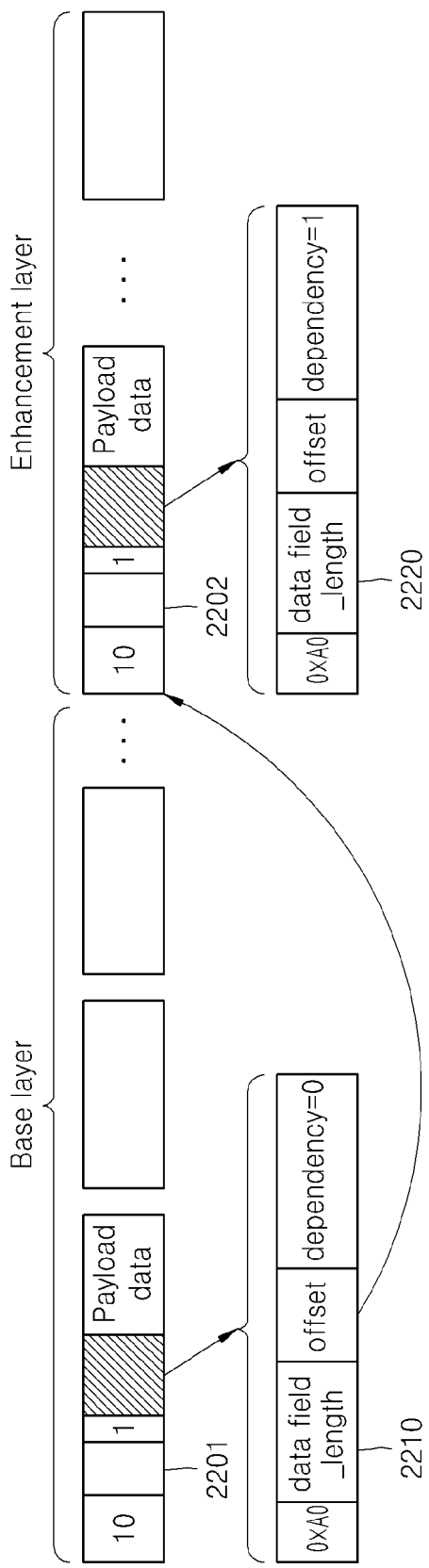
FIG. 22 is a diagram illustrating random accessing performed using location information, according to another exemplary embodiment.

FIG. 22 is a diagram illustrating random accessing performed using location information 2210 and 2220, according to another exemplary embodiment. FIG. 22 illustrates scalable image data of a plurality of layers.

The obtaining unit 1420 of FIG. 14 accesses a packet 2201 that corresponds to a base layer and is randomly accessible, and obtains the location information 2210 from a 'Private_data_bytes' field in the packet 2201.

Referring to FIG. 22, 'dependency_flag' (or 'weighting_flag') field in the location information 2210 represents that the packet 2201 provides saclable image data. Also, the layer of the packet 2201 may be checked by using the 'dependency' field in the location information 2210. Since the 'dependency' field in the packet 2201 has a value of 0, the packet 2201 corresponds to a base layer.

The obtaining unit 1420 accesses a packet 2202 which is an upper layer by referring to 'offset' field, and obtains the location information 2220 from a 'Private_data_bytes' field in the packet 2202. In FIG. 22, a 'dependency' field in the packet 2202 has a value of 1, and the packet 2202 thus corresponds to an enhancement layer.

Figure 23:
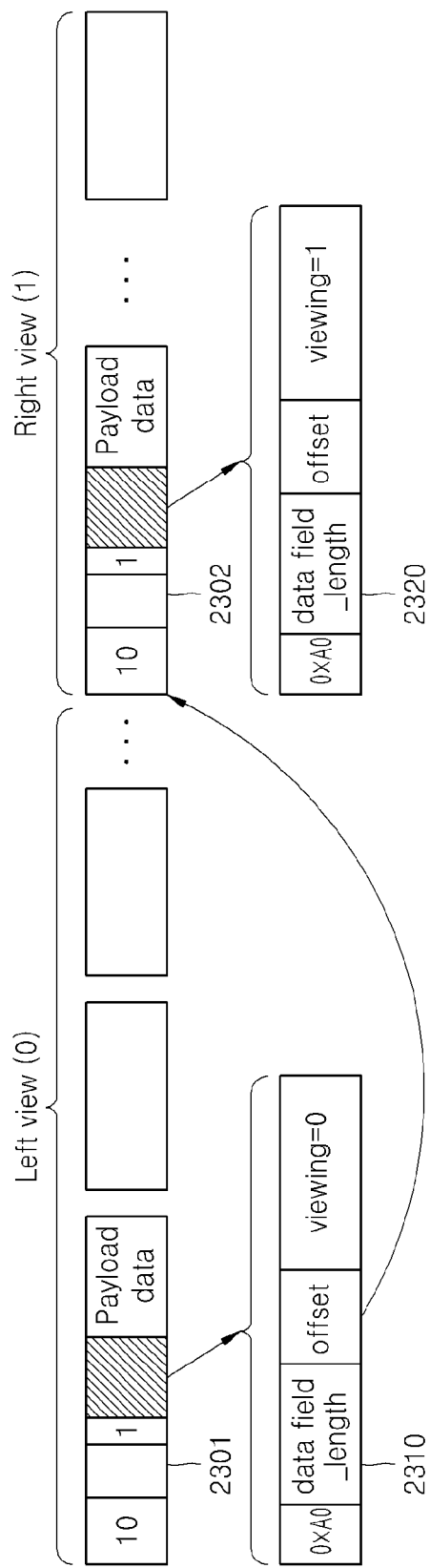
FIG. 23 is a diagram illustrating random accessing performed using location information, according to another exemplary embodiment.

FIG. 23 is a diagram illustrating random accessing performed using location information 2310 and 2320, according to another exemplary embodiment. FIG. 23 illustrates stereoscopic image data consisting of left-viewpoint image data and right-viewpoint image data.

The obtaining unit 1420 of FIG. 14 accesses a packet 2301 that corresponds to the left-viewpoint image data and is randomly accessible, and obtains the location information 2310 from a 'Private_data_bytes' field in the packet 2301.

It may be determined that the packet 2301 provides a 3D image based on a 'viewing_flag' field in the location information 2310. Also, the viewpoint of the image that the packet 2301 provides may be determined based on a 'viewing' field in location information 2310. Since a 'dependency' field in the packet 2301 has a value of 0, the packet 2301 provides the left-viewpoint image data.

The obtaining unit 1420 accesses a packet 2302 that corresponds to the right-viewpoint data and is randomly accessible, via an 'offset' field, and obtains the location information 2320 from a 'Private_data_bytes' field in the packet 2303. In FIG. 23, since a 'viewing' field in the packet 2302 has a value of 1, the packet 2302 provides the right-viewpoint image data.

FIG. 24 is a table illustrating a second type of location information 2410 according to another exemplary embodiment. The location information 2410 of FIG. 24 is the same as the location information 1710 of FIG. 17A except for some of fields thereof and will thus not be described again.

FIG. 25 is a table illustrating a third type of location information 2510 according to another exemplary embodiment. The location information 2510 of FIG. 25 is the same as the location information 1910 of FIG. 19 except for some of fields thereof and will thus not be described again.

FIG. 26A illustrates the structure of an MPEG TS that includes location information, according to an exemplary embodiment. Referring to FIG. 26A, a field to which "private data" is input is present as "private-data-byte" in an "Adaptation field". The data transmitting apparatus 1300 defines the length of the "private-data-byte" and records the length to a "transport-private-data-length" field. The data transmitting apparatus 1300 records the "private data" in the "private-data-byte" field according to the "transport-private-data-length" field. The "private-data-byte" has a value in the form of "unsigned integer". The value of "private-data-byte" means an offset value regarding a starting location of a TS packet having a subsequent I-frame with respect to a current TS packet. If several I-frames are present in a TS, an "Adaptation field" is present at the start of each of the I-frames.

FIG. 26B illustrates the structure of an MPEG-2 TS that includes location information, according to another exemplary embodiment. Referring to FIG. 26B, a header of an MPEG-2 TS packet includes an 'adaptaion_field'. The 'adaptation_field' includes an 'adaptation_field_extension' field. The 'adaptation_field_extension' field includes a 'reserved' region that a user may freely define and use. Referring to FIG. 26B, in the 'adaptation_field_extension' field, a flag indicating whether location information according to an exemplary embodiment is preset and a field including bytes representing a location of a subsequent random access point are inserted.

Referring to FIG. 26B, only fields related to the location information will be described for convenience of explanation.

An 'adaptation_field_extension_flag' field 2611 indicates whether an 'adaptation_field_extension' field is present in the 'adaptation_field'.

A 'random_access_point_flag' field 2612 indicates whether information regarding location of a random access point is present in the 'adaptation_field_extension' field.

A 'random_access_point_count' field 2613 represents the total number of random access points provided in the TS packet.

If the 'random_access_point_count' field 2613 has a value of 1, it means that the TS packet includes location information of only one random access point. An example of the TS packet when the 'random_access_point_count' field 2613 has a value of 1 is illustrated in FIG. 32A. Referring to FIG. 32A, the TS packet includes location information of only a subsequent random access point, and location information of a random access point subsequent to the subsequent random access point may be obtained from a TS packet in which the subsequent random access point starts.

If the 'random_access_point_count' field 2613 has a value of 2 or more, it means that the TS packet includes location information of a plurality of random access points. An example of the TS packet when the 'random_access_point_count' field 2613 has a value of 2 or more is illustrated in FIG. 32B. Referring to FIG. 32B, the TS packet includes location information of the plurality of random access points. Thus, locations of random access points present in a predetermined section may be detected by detecting this TS packet.

A 'random_access_point_length' field 2614 represents a total of bytes from a current TS packet to a TS packet in which a subsequent random access point starts.

The data receiving apparatus 1400 determines whether a 'random_access_indicator' field is present by obtaining information included in the 'adaptation_field_extension' field by parsing the header of the TS packet.

If the 'random_access_indicator' field is present, the location of the random access point may be easily detected by using the 'random_access_point_count' field 2613 and the 'random_access_point_length' field 2614.

Referring to FIG. 26B, location information according to an exemplary embodiment is inserted into the 'adaptation_field_extension' field, thereby effectively providing the location information of a random access point without having to greatly change the structure of the TS packet.

Figures 26C, 26D:
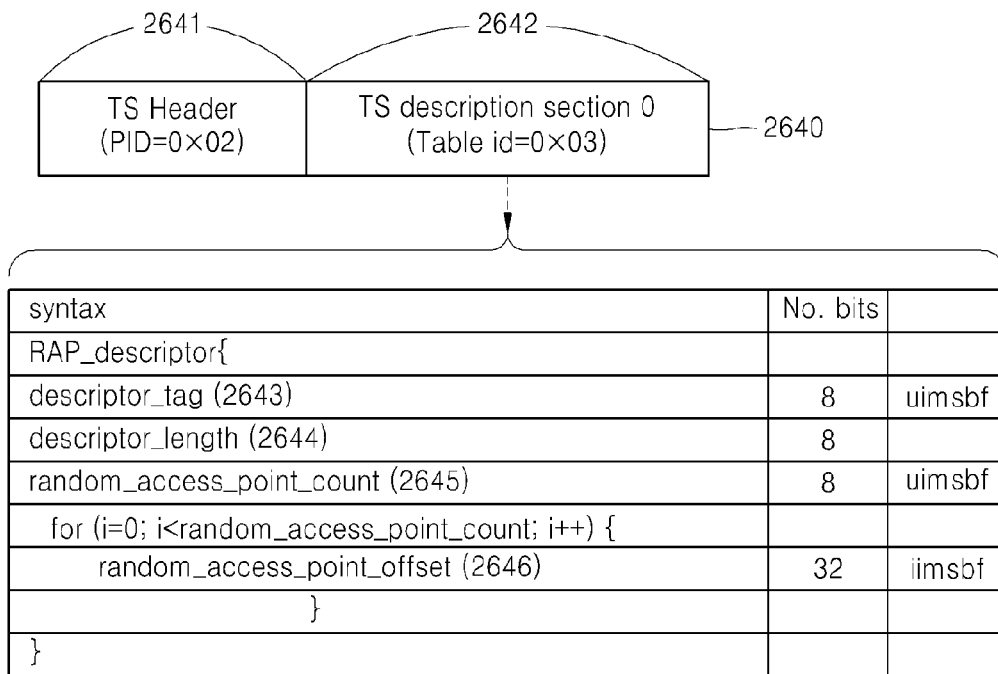

FIG. 26C illustrates a 'TS_description_section' that includes location information, according to an exemplary embodiment location. According to the MPEG 2 standard, various sections have been defined to transmit signaling information, such as program information. Table 3 illustrates an example of a section defined in the MPEG 2 standard.

TABLE 3

| Structure Name | Stream Type | PID number | Description |
| --- | --- | --- | --- |
| Program Association Table | ITU-T Rec H. 222.0 ISO/IEC 13818-1 | 0x00 | Associates Program Number and Program Map Table PID |
| Program Map Table | ITU-T Rec H. 222.0 ISO/IEC 13818-1 | Assignment indicated in the PAT | Specifies PID values for component of one or more programs |
| Network Information Table | Private | Assignment indicated in the PAT | Physical network parameters such as FDM frequencies, Transponder, Number, etc. |
| Conditional Access Table | ITU-T Rec H. 222.0 ISO/IEC 13818-1 | 0x01 | Associates one or more(private) EMM streams each with a unique PID value |
| Transport Stream Description Table | ITU-T Rec H. 222.0 ISO/IEC 13818-1 | 0x02 | Associates one or more descriptors from Table 2-39 to an entire Transport Stream |

In the MPEG standard, various types of sections, such as a PAT and a PMT, have been defined, in which a unique 'PID' is assigned to each of the sections.

Also, a 'table_id' value is assigned to each of the sections. Table 4 shows the types of a section according to the 'table_id' value.

TABLE 4

| Value | Description |
| --- | --- |
| 0x00 | program_association_table |
| 0x01 | conditional_access_table |
| 0x02 | program_map_table |
| 0x03 | TS_description_table |
| 0x04 | ISO_IEC_14496_scene_description_table |
| 0x05 | ISO_IEC_14496_object_description_table |
| 0x06~0x37 | ITU-T Rec. H.222.0|ISO/IEC 13818-1 reserved |
| 0x38~0x3F | Defined in ISO/IEC 13818-6 |
| 0x40~0xFE | User private |
| 0xFF | forbidden |

Referring to Tables 3 and 4, a section, the 'table id' value of which is '0x00' is a PAT, and '0x00' is assigned thereto as a PID. Also, a section, the 'table id' value of which is '0x03' is the 'TS_description_section', and '0x02' is assigned thereto as a PID. The 'TS_description_section' provides various descriptors.

Referring to FIG. 26C, in the TS_description_section, a 'table_id' field 2631 has a value of '0x03'.

A 'descriptor' field 2632 includes location information according to an exemplary embodiment. An example of location information that may be included in the 'descriptor' field 2632 according to an exemplary embodiment, will now be described above with reference to FIG. 26D.

FIG. 26D illustrates a TS packet 2640 that includes location information inserted into a 'TS_description_section( )', according to an exemplary embodiment. The TS packet 2640 includes a header 2641 and a payload region 2642. The header 2641 includes a PID field for identifying data included in the payload region 2642.

In the payload region 2642, the 'TS_description_section( )' that includes location information of a random access point is present. Thus, the TS packet 2640 has a PID of '0x02' and a 'table id' of '0x03'.

The location information of the random access point may include a 'descriptor_tag' field 2643, a 'descriptor_length' field 2644, a 'random_access_point_count' field 2645, and a 'random_access_point_offset' field 2646.

The 'descriptor_tag' field 2643 is an 8-bit identifier for identifying each descriptor.

The 'descriptor_length' field 2644 is an 8-bit field representing a total of bytes of each descriptor.

The 'random_access_point_count' field 2645 represents the total number of random access points provided by a TS packet.

The 'random_access_point_length' field 2646 field represents the locations of the random access points.

FIG. 26E illustrates the structure of a 'TS_program_map_section' according to the MPEG-2 standard (hereinafter, referred to as a 'PMT'), according to an exemplary embodiment.

The PMT includes mapping information between a 'stream_type' field 2651 and an 'elementary_PID' field 2652. In other words, the PMT provides identification information regarding a particular type of data.

The MPEG 2 standard provides a 'reserved' region that a user may freely use when the 'stream_type' field 2651 has a value of '0x80' to '0xFF'. Thus, one of '0x80' to '0xFF' may be set as location information according to an exemplary embodiment. For example, it may be assumed that if the 'stream_type' field 2651 has a value of '0x80', a corresponding stream includes the location information.

At the same time, an 'elementary_PID' of the stream that includes the location information is set to one of 'reserved' values, e.g., '1000'.

If a receiver wants to obtain a stream which includes location information of random access point, the receiver may obtain a packet, the elementary_PID 2652 of which is '1000'.

Figure 26F:
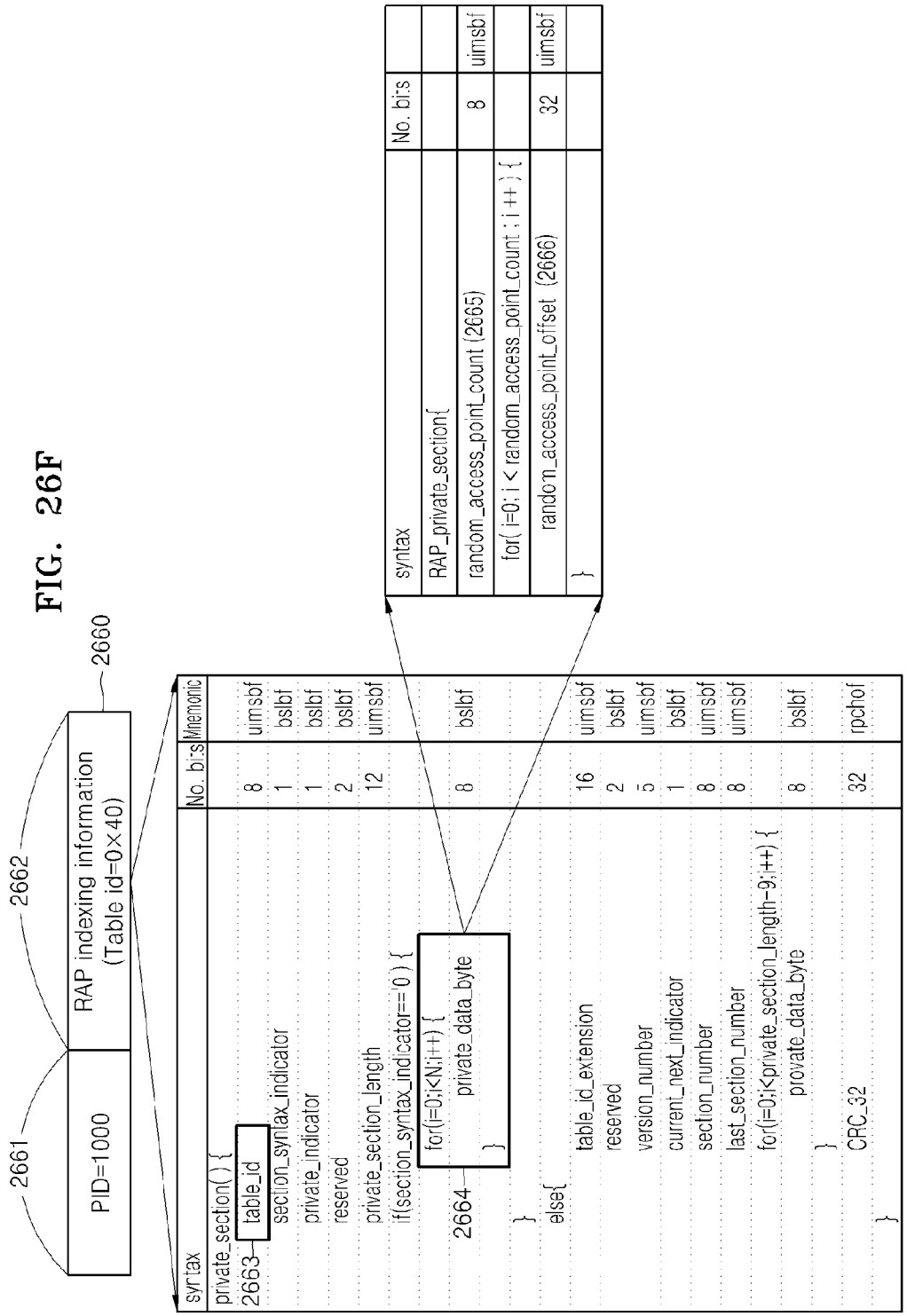

FIG. 26F illustrates a TS packet 2660 that includes location information inserted into a 'private_section( )' field, according to an exemplary embodiment. The TS packet 2660 includes a header 2661 and a payload region 2662. The header 2661 has a PID field for identifying data included in the payload region 2662. Since the TS packet 2660 has a PID of 1000, the payload region 2662 includes location information of a random access point.

Although it is assumed in an exemplary embodiment, the location information of the random access point is transmitted using the 'private_section( )' field, in other exemplary embodiments, the location information of the random access point may be transmitted as follows.

i) setting a new section including the location information of the random access point, ii) setting a new PID of a TS packet representing that a payload of the TS packet includes the location information of the random access point, iii) setting a new (or conventional) MP4 box including the location information of the random access point, iv) setting a segment including the location information of the random access point on at least one of the other segments.

Referring to FIG. 26F, the payload region 2662 of the TS packet 2660 includes the 'private_section( )' field. An MPEG 2 TS provides a 'reserved' region when a 'table_id' has a value of '0x40' to '0xFE', so that that a user may newly define and use a section. Also, a section, the 'table id' of which has a value '0x40' is defined as the 'private_section( )' field, and location information according to an exemplary embodiment is inserted into the 'private_section( )' field.

The 'private_section( )' field includes a 'table_id' field 2663 and a 'private_data_type' field 2664.

The 'table_id' field 2663 represents section type.

The 'private_data_type' field 2664 includes the location information according to an exemplary embodiment. The location information may include a 'random_access_point_count' field 2665 and a 'random_access_point_offset' field 2666 which are as described above with reference to FIG. 26D.

Figure 27:
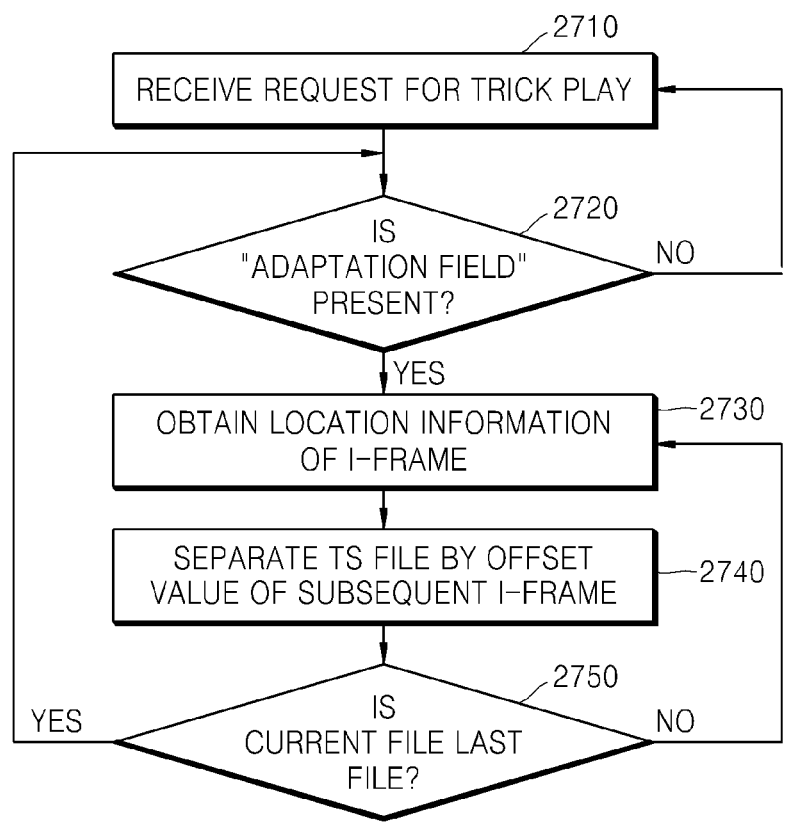
FIG. 27 is a flowchart illustrating a method of providing a service when a user of a data receiving apparatus requests trick play, according to an exemplary embodiment.

FIG. 27 is a flowchart illustrating a method of providing a service when a user of a data receiving apparatus requests trick play, according to an exemplary embodiment. In FIG. 27, it is assumed that trick play is provided by sequentially reproducing I-frames.

In operation 2710, a request for performing trick play is received from the user.

In operation 2720, it is determined whether an "Adaptation field" is present in a packet. If the packet includes the "Adaptation field", operation 2730 is performed. If the packet does not include the "Adaptation field", it is determined whether the "Adaptation field" is present in a subsequent packet. If a client knows the location of a packet that includes location information, e.g., when it is determined that a first packet included in a segment includes the location information, then operation 2720 may not be performed.

In operation 2730, the locations of the I-frames are checked by obtaining the location information from a "private-data-byte" field in the "Adaptation field". If a first type of location information is obtained, only a location of a subsequent I-frame may be learned. If a second or a third type of location information is obtained, the locations of all of the I-frames in the segment may be learned.

A method of extracting an offset value of a subsequent I-frame will be briefly described on an assumption that the first type of location information is obtained. For example, if an offset value is '2462', '0x99E' is obtained by changing '2462' to a 16-bit value. Since an "unsigned integer" is 4-bytes long, a value of "transport-private-data-length" is registered as '4'. Next, '0x99E' is transformed into "0x00 0x00 0x09 0x9E" that is a 4-byte integer. Then, "0x00 0x00 0x09 0x9E" is input to a "private-data-byte" field. If an offset value is extracted from the "private-data-byte" field, when 'private-data-byte' is known as 'pdb[4]', the offset value may be calculated as '(int) (pdb[3]<<24|pdb[2]<<16|pdb[1]<<8|pdb[0])'.

In operation 2740, a TS file is separated by an offset value of the subsequent I-frame from the segment file. In operation 2750, it is determined whether a current file is a last file included in the segment. If the current file is not a last file in the segment, the method returns back to operation 2730 and a subsequent I-frame is extracted. If the current file is a last file in the segment, the method returns back to operation 2720 and the operations described above are performed on a subsequent segment.

Figure 28:
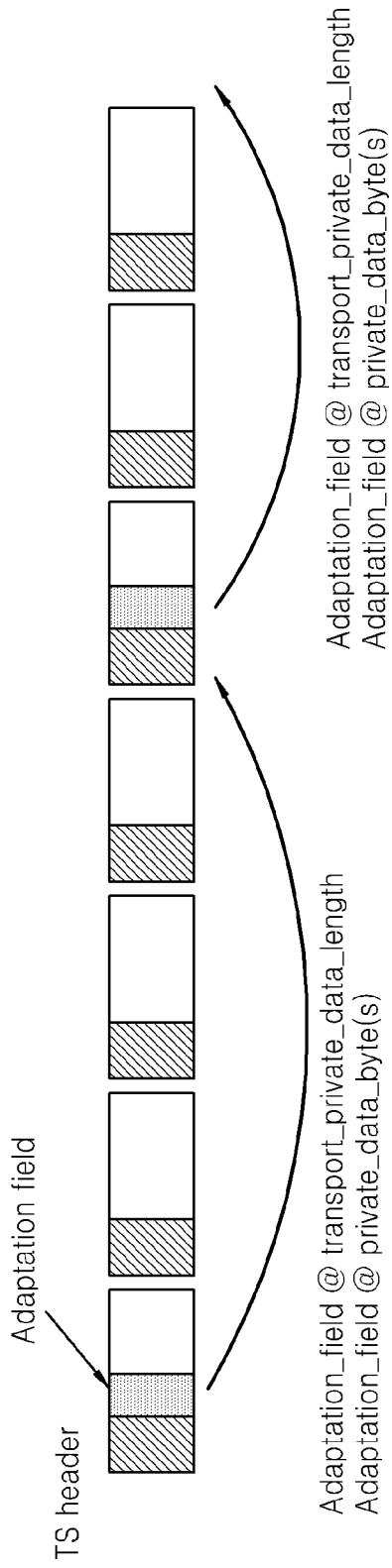
FIG. 28 illustrates the structure of a TS packet for searching an MPEG TS for an I-frame, according to an exemplary embodiment.

FIG. 28 illustrates the structure of a TS packet for searching an MPEG TS for an I-frame, according to an exemplary embodiment. An "Adaptation field" is a part of a header of the TS packet, and is an optional field to which additional information regarding the TS packet is input. The "Adaptation field" has various parameters, one of which is a "private data field" that a user may freely use. "transport-private-data-length" is a parameter indicating the size of the "private data field" in the "Adaptation field". A "private-data-byte" field is a region in which data that the user freely defines is stored. A client may calculate a starting location of a subsequent I-frame in the MPEG TS based on "transport-private-data-length" and "private-data-byte".

Figure 29:
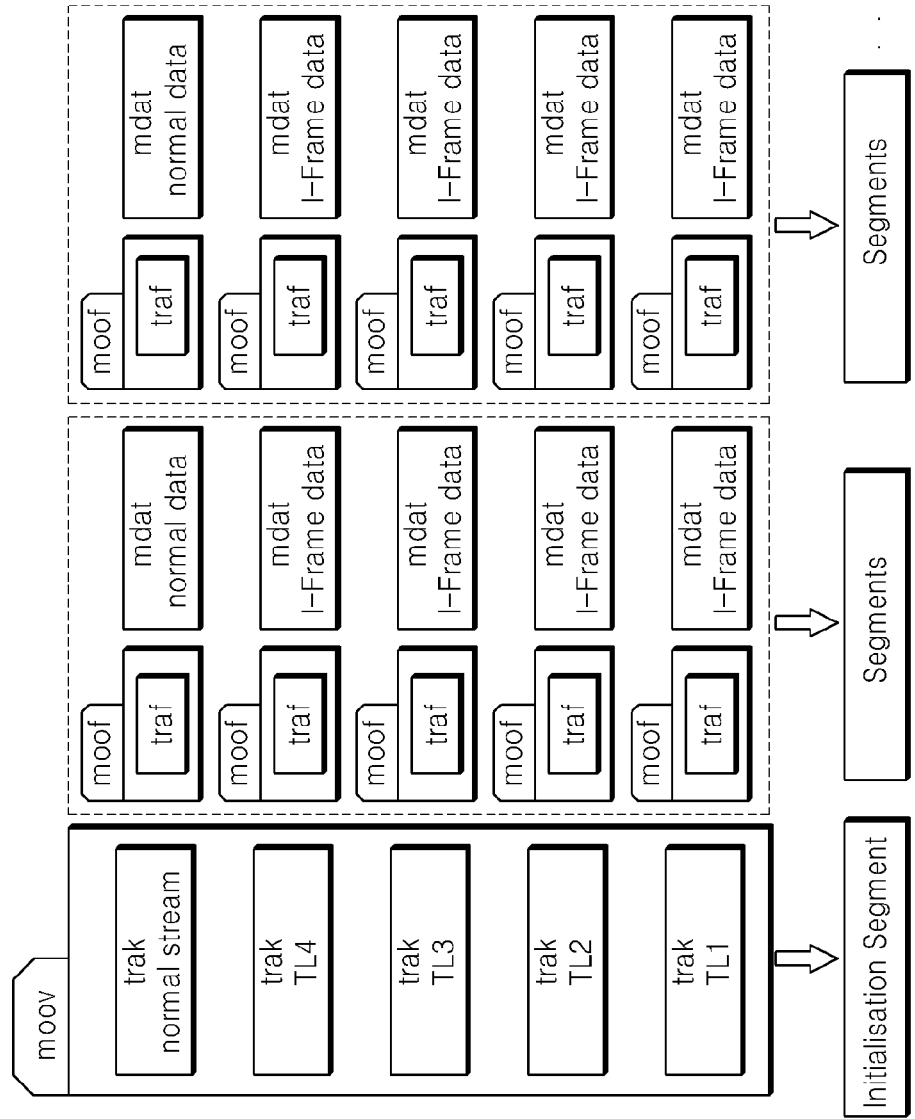
FIG. 29 illustrates the structure of an MP4 file for searching an MPEG TS for an I-frame according to an exemplary embodiment.

FIG. 29 illustrates the structure of an MP4 file for searching an MPEG TS for an I-frame according to an exemplary embodiment. In the MP4 file, a segment generated by dividing encoded data based on a time segment includes a "moof" box and a "mdat" box. The "moof" box includes meta data regarding the segment, and the "mdat" box includes payload data providing content.

Location information of an I-frame may be obtained by using a "Trak" box or the 'moof' box included in the "Traf".

Figure 30:
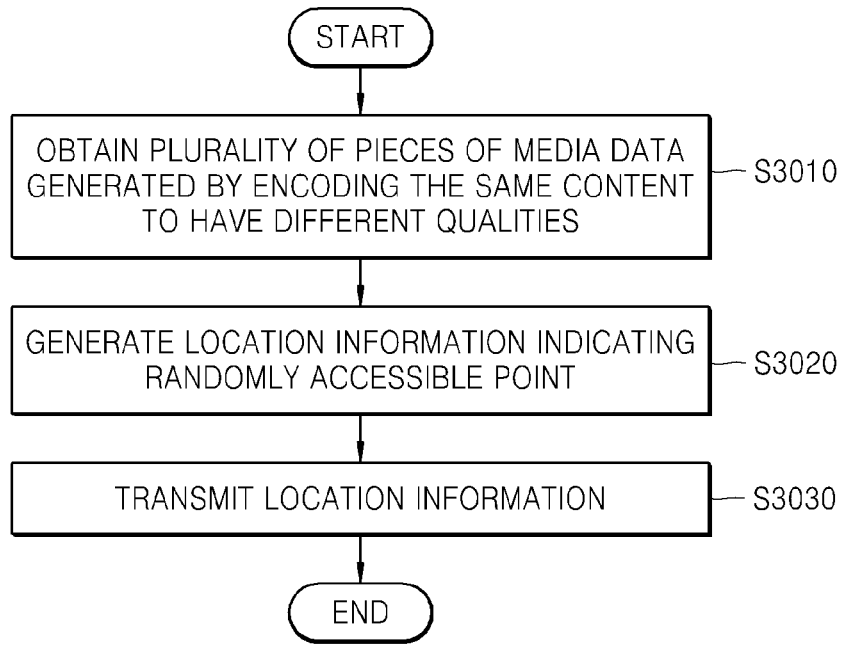
FIG. 30 is a flowchart illustrating a method of transmitting data according to an exemplary embodiment.

FIG. 30 is a flowchart illustrating a method of transmitting data according to an exemplary embodiment. In operation S3010, a plurality of media data, each of which includes at least one segment and that are generated by encoding the same content to have different qualities, are obtained.

In operation S3020, location information indicating a random accessible point for each of the segments is generated.

In operation S3030, the location information is transmitted.

Figure 31:
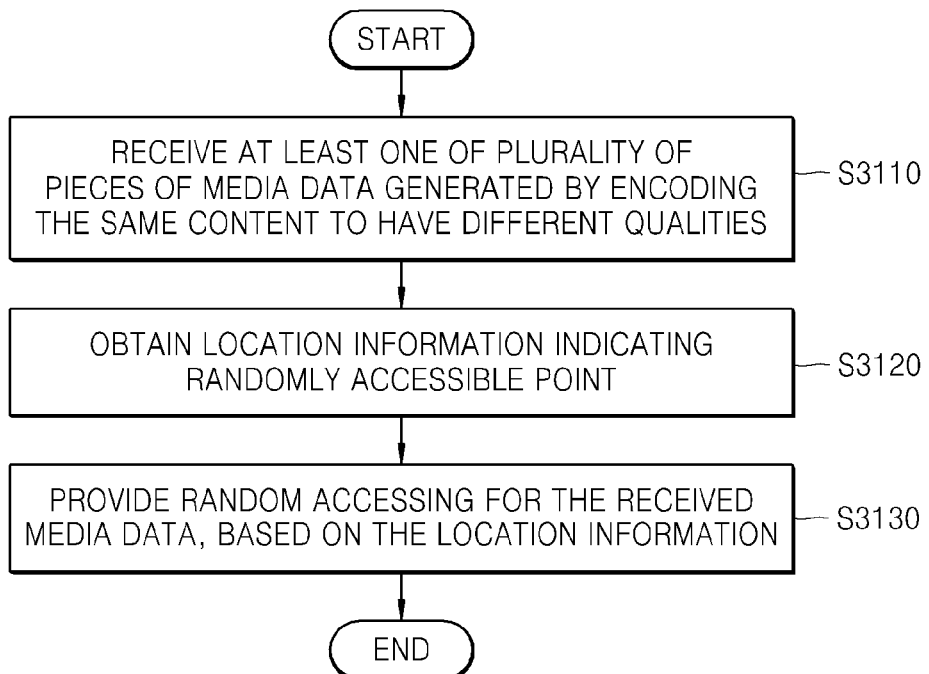
FIG. 31 is a flowchart illustrating a method of receiving data according to an exemplary embodiment.

FIG. 31 is a flowchart illustrating a method of receiving data according to an exemplary embodiment. In operation S3110, at least one of a plurality of media data each including at least one segment is received, in which the plurality of media data are generated by encoding the same content to have different qualities.

In operation S3120, location information indicating a randomly accessible point for each of the segments is obtained from the received media data.

In operation S3130, random accessing is provided for the received media data, based on the location information The above exemplary embodiments may be embodied as a computer program. The computer program may be stored in a computer readable recording medium, and executed using a general digital computer.

Examples of the computer readable medium include a magnetic recording medium (a ROM, a floppy disc, a hard disc, etc.), and an optical recording medium (a CD-ROM, a DVD, etc.).

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method of receiving a content for an apparatus for receiving content comprising at least one processor, the method comprising:
   receiving, by the apparatus for receiving content, at least one media data generated by encoding the content to have different properties, wherein each of the at least one media data comprises at least one segment;
   obtaining, by the apparatus for receiving content, location information indicating at least one position in the received media data that enables playback of the content to be started from the at least one position onwards; and
   providing, by the apparatus for receiving content, the at least one position which can be accessed on the received media data, based on the location information,
   wherein the location information includes type information providing a relationship between the at least one position which can be accessed relative to a start of a segment.

2. The method of claim 1, wherein the obtaining location information comprises obtaining index information indicating the at least one position corresponding to packet included in the at least one segment, wherein the index information comprises access unit information identifying a frame included in the packet; and
   performing access to the at least one position on the received media data, based on the index information.

3. The method of claim 2, wherein the at least one media data is encoded according to the MPEG 4 standard, and
   the obtaining the location information comprises obtaining the location information from at least one from among a 'moov' box and a 'moof' box.

4. The method of claim 1, wherein the location information comprises first offset information representing a location of a randomly accessible subsequent packet included in the at least one segment corresponding to the location information.

5. The method of claim 1, wherein the location information comprises second offset information representing locations of all randomly accessible packets included in the at least one segment corresponding to the location information.

6. The method of claim 5, wherein, if the location information is divided and included in a plurality of packets the location information further comprises end information indicating whether a current packet is a last packet that includes the location information.

7. The method of claim 1, wherein the location information comprises third offset information representing locations of all access units in the at least one segment corresponding to the location information.

8. The method of claim 7, wherein the location information further comprises image type information representing a type of an image frame indicated by the access units.

9. The method of claim 1, wherein a type of the location information is categorized according to a manner in which the location information specifies the at least one position.

10. The method of claim 1, wherein the location information comprises first dependency information representing whether a randomly accessible packet in the at least one segment corresponding to the location information, is to be reproduced together with other packets.

11. The method of claim 10, wherein the location information further comprises second dependency information representing a total number of packets to be reproduced together with the randomly accessible packet.

12. The method of claim 11, wherein the providing random accessing comprises obtaining the packets that are to be reproduced together with the randomly accessible packet, based on the location information.

13. The method of claim 1, wherein the location information comprises three-dimensional (3D) image information indicating whether a randomly accessible packet in the at least one segment corresponding to the location information is to be used to provide a 3D image.

14. The method of claim 13, wherein the location information further comprises viewpoint information indicating a viewpoint of an image frame provided by the randomly accessible packet.

15. The method of claim 1, wherein the at least one media data is encoded according to the MPEG 2 standard, and
the obtaining the location information comprises obtaining the location information from at least one from among a 'private_data_bytes' field and an 'adaptation_field_extension' field that are included in an 'adaptation_field' of at least one packet included in each of the at least one segment.

16. The method of claim 1, wherein the at least one media data is encoded according to the MPEG 2 standard, and
the obtaining the location information comprises obtaining the location information from at least one section that includes program information.

* * * * *